(12) United States Patent
Lin et al.

(10) Patent No.: US 10,431,168 B2
(45) Date of Patent: *Oct. 1, 2019

(54) METHODS FOR DRIVING FOUR PARTICLE ELECTROPHORETIC DISPLAY

(71) Applicant: E Ink California, LLC, Fremont, CA (US)

(72) Inventors: Craig Lin, Oakland, CA (US); Ming-Jen Chang, New Taipei (TW)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,946

(22) Filed: Nov. 6, 2018

(65) Prior Publication Data
US 2019/0073966 A1 Mar. 7, 2019

Related U.S. Application Data

(63) Continuation of application No. 15/724,718, filed on Oct. 4, 2017, now Pat. No. 10,147,366, which is a
(Continued)

(51) Int. Cl.
*G09G 3/34* (2006.01)
*G09G 3/20* (2006.01)
(Continued)

(52) U.S. Cl.
CPC ............ *G09G 3/344* (2013.01); *G02F 1/167* (2013.01); *G09G 3/2003* (2013.01);
(Continued)

(58) Field of Classification Search
CPC ........... G09G 3/344; G09G 2300/0452; G09G 2300/0473; G09G 2310/06;
(Continued)

(56) References Cited

U.S. PATENT DOCUMENTS 3,756,693 A 9/1973 Ota
3,892,568 A 7/1975 Ota
(Continued)

FOREIGN PATENT DOCUMENTS

CN 1705907 12/2005
JP 2006343458 12/2006
(Continued)

OTHER PUBLICATIONS

Korean Intellectual Property Office, PCT/US2018/054069, International Search Report and Written Opinion, dated Feb. 25, 2019.
(Continued)

*Primary Examiner* — Shaheda A Abdin
(74) *Attorney, Agent, or Firm* — Brian D. Bean

(57) ABSTRACT

The present invention provides driving methods for a color display device in which each pixel can display four high-quality color states. More specifically, an electrophoretic fluid is provided which comprises four types of particles, dispersed in a solvent or solvent mixture.

10 Claims, 33 Drawing Sheets

Related U.S. Application Data continuation-in-part of application No. 14/939,666, filed on Nov. 12, 2015, now Pat. No. 9,812,073.

(60) Provisional application No. 62/080,845, filed on Nov. 17, 2014.

(51) Int. Cl.
 *G02F 1/167* (2019.01)
 *G02F 1/1675* (2019.01)

(52) U.S. Cl.
 CPC .. *G02F 2001/1678* (2013.01); *G02F 2203/34* (2013.01); *G09G 2300/0452* (2013.01); *G09G 2300/0473* (2013.01); *G09G 2310/06* (2013.01); *G09G 2310/067* (2013.01); *G09G 2310/068* (2013.01); *G09G 2310/08* (2013.01)

(58) Field of Classification Search
 CPC ........ G09G 2310/067; G09G 2310/068; G02F 2001/1678; G02F 2203/34
 See application file for complete search history.

(56) References Cited

U.S. PATENT DOCUMENTS

| | | | |
|---|---|---|---|
| 4,298,448 | A | 11/1981 | Muller |
| 5,378,574 | A | 1/1995 | Winnik |
| 5,930,026 | A | 7/1999 | Jacobson |
| 5,980,719 | A | 11/1999 | Cherukuri |
| 6,198,809 | B1 | 3/2001 | DiSanto |
| 6,337,761 | B1 | 1/2002 | Rogers |
| 6,373,461 | B1 | 4/2002 | Hasegawa |
| 6,486,866 | B1 | 11/2002 | Kuwahara |
| 6,517,618 | B2 | 2/2003 | Foucher |
| 6,525,866 | B1 | 2/2003 | Lin |
| 6,538,801 | B2 | 3/2003 | Jacobson |
| 6,600,534 | B1 | 7/2003 | Tanaka |
| 6,650,462 | B2 | 11/2003 | Katase |
| 6,680,726 | B2 | 1/2004 | Gordon, II |
| 6,693,620 | B1 | 2/2004 | Herb |
| 6,704,133 | B2 | 3/2004 | Gates |
| 6,724,521 | B2 | 4/2004 | Nakao |
| 6,729,718 | B2 | 5/2004 | Goto |
| 6,751,007 | B2 | 6/2004 | Liang |
| 6,751,008 | B2 | 6/2004 | Liang |
| 6,753,844 | B2 | 6/2004 | Machida |
| 6,781,745 | B2 | 8/2004 | Chung |
| 6,829,078 | B2 | 12/2004 | Liang |
| 6,850,357 | B2 | 2/2005 | Kaneko |
| 6,864,875 | B2 | 3/2005 | Drzaic |
| 6,876,486 | B2 | 4/2005 | Hiraoka |
| 6,930,818 | B1 | 8/2005 | Liang |
| 6,947,203 | B2 | 9/2005 | Kanbe |
| 6,967,762 | B2 | 11/2005 | Machida |
| 6,987,503 | B2 | 1/2006 | Inoue |
| 6,987,605 | B2 | 1/2006 | Liang |
| 7,009,756 | B2 | 3/2006 | Kishi |
| 7,019,889 | B2 | 3/2006 | Katase |
| 7,034,987 | B2 | 4/2006 | Schlangen |
| 7,038,655 | B2 | 5/2006 | Herb |
| 7,046,228 | B2 | 5/2006 | Liang |
| 7,050,218 | B2 | 5/2006 | Kanbe |
| 7,057,600 | B2 | 6/2006 | Goden |
| 7,057,798 | B2 | 6/2006 | Ukigaya |
| 7,075,502 | B1 | 7/2006 | Drzaic |
| 7,116,466 | B2 | 10/2006 | Whitesides |
| 7,226,550 | B2 | 6/2007 | Hou |
| 7,259,744 | B2 | 8/2007 | Arango |
| 7,271,947 | B2 | 9/2007 | Liang |
| 7,283,119 | B2 | 10/2007 | Kishi |
| 7,292,386 | B2 | 11/2007 | Kanbe |
| 7,303,818 | B2 | 12/2007 | Minami |
| 7,304,987 | B1 | 12/2007 | James |
| 7,312,916 | B2 | 12/2007 | Pullen |
| 7,342,556 | B2 | 3/2008 | Oue |
| 7,345,810 | B2 | 3/2008 | Chopra et al. |
| 7,349,147 | B2 | 3/2008 | Chopra |
| 7,352,353 | B2 | 4/2008 | Albert |
| 7,365,732 | B2 | 4/2008 | Matsuda |
| 7,382,351 | B2 | 6/2008 | Kishi |
| 7,411,719 | B2 | 8/2008 | Paolini, Jr. |
| 7,417,787 | B2 | 8/2008 | Chopra |
| 7,420,549 | B2 | 9/2008 | Jacobson |
| 7,433,113 | B2 | 10/2008 | Chopra |
| 7,443,570 | B2 | 10/2008 | Chopra |
| 7,474,295 | B2 | 1/2009 | Matsuda |
| 7,492,505 | B2 | 2/2009 | Liang |
| 7,502,162 | B2 | 3/2009 | Lin |
| 7,495,821 | B2 | 5/2009 | Yamakita |
| 7,545,557 | B2 | 6/2009 | Iftime |
| 7,548,291 | B2 | 6/2009 | Lee |
| 7,557,981 | B2 | 7/2009 | Liang |
| 7,580,025 | B2 | 8/2009 | Nakai |
| 7,605,972 | B2 | 10/2009 | Kawai |
| 7,609,435 | B2 | 10/2009 | Moriyama |
| 7,626,185 | B2 | 12/2009 | Krak |
| 7,636,076 | B2 | 12/2009 | Hung |
| 7,652,656 | B2 | 1/2010 | Chopra |
| 7,656,576 | B2 | 2/2010 | Suwabe |
| 7,679,599 | B2 | 3/2010 | Kawai |
| 7,686,463 | B2 | 3/2010 | Goto |
| 7,760,419 | B2 | 7/2010 | Lee |
| 7,782,292 | B2 | 8/2010 | Miyasaka |
| 7,808,696 | B2 | 10/2010 | Lee |
| 7,834,844 | B2 | 11/2010 | Kim |
| 7,848,009 | B2 | 12/2010 | Machida |
| 7,852,547 | B2 | 12/2010 | Kim |
| 7,852,548 | B2 | 12/2010 | Roh |
| 7,907,327 | B2 | 3/2011 | Jang |
| 7,911,681 | B2 | 3/2011 | Ikegami |
| 7,982,941 | B2 | 7/2011 | Lin |
| 8,035,611 | B2 | 10/2011 | Sakamoto |
| 8,040,594 | B2 | 10/2011 | Paolini, Jr. |
| 8,054,288 | B2 | 11/2011 | Sugita |
| 8,067,305 | B2 | 11/2011 | Zafiropoulo |
| 8,068,090 | B2 | 11/2011 | Machida |
| 8,072,675 | B2 | 12/2011 | Lin |
| 8,081,375 | B2 | 12/2011 | Komatsu |
| 8,089,686 | B2 | 1/2012 | Addington |
| 8,115,729 | B2 | 2/2012 | Danner |
| 8,120,838 | B2 | 2/2012 | Lin |
| 8,159,636 | B2 | 4/2012 | Sun |
| 8,164,823 | B2 | 4/2012 | Ikegami |
| 8,169,690 | B2 | 5/2012 | Lin |
| 8,174,491 | B2 | 5/2012 | Machida |
| 8,174,492 | B2 | 5/2012 | Kim |
| 8,237,892 | B1 | 8/2012 | Sprague |
| 8,243,013 | B1 | 8/2012 | Sprague |
| 8,319,724 | B2 | 11/2012 | Wang |
| 8,355,196 | B2 | 1/2013 | Yan |
| 8,395,836 | B2 | 3/2013 | Lin |
| 8,422,116 | B2 | 4/2013 | Sprague |
| 8,441,713 | B2 | 5/2013 | Kawashima |
| 8,441,714 | B2 | 5/2013 | Paolini, Jr. |
| 8,466,852 | B2 | 6/2013 | Drzaic |
| 8,477,405 | B2 | 7/2013 | Ishii |
| 8,491,767 | B2 | 7/2013 | Gibson |
| 8,605,354 | B2 | 7/2013 | Zhang |
| 8,503,063 | B2 | 8/2013 | Sprague |
| 8,520,296 | B2 | 8/2013 | Wang |
| 8,537,104 | B2 | 9/2013 | Markvoort |
| 8,537,454 | B2 | 9/2013 | Abe |
| 8,565,522 | B2 | 10/2013 | Swic |
| 8,570,272 | B2 | 10/2013 | Hsieh |
| 8,570,639 | B2 | 10/2013 | Masuzawa |
| 8,574,937 | B2 | 11/2013 | Shi |
| 8,610,998 | B2 | 12/2013 | Baisch |
| 8,629,832 | B2 | 1/2014 | Tanabe |
| 8,649,084 | B2 | 2/2014 | Wang |
| 8,670,174 | B2 | 3/2014 | Sprague |
| 8,674,978 | B2 | 3/2014 | Komatsu |
| 8,681,191 | B2 | 3/2014 | Yang |
| 8,687,265 | B2 | 4/2014 | Ahn |

(56) References Cited

U.S. PATENT DOCUMENTS

| | | | |
|---|---|---|---|
| 8,704,754 B2 | 4/2014 | Machida |
| 8,704,756 B2 | 4/2014 | Lin |
| 8,717,662 B2 | 5/2014 | Komatsu |
| 8,717,664 B2 | 5/2014 | Wang |
| 8,730,216 B2 | 5/2014 | Mizutani |
| 8,786,935 B2 | 7/2014 | Sprague |
| 8,791,896 B2 | 7/2014 | Kwon |
| 8,797,258 B2 | 8/2014 | Sprague |
| 8,797,636 B2 | 8/2014 | Yang |
| 8,797,637 B2 | 8/2014 | Fujishiro |
| 8,810,899 B2 | 8/2014 | Sprague |
| 8,902,491 B2 | 12/2014 | Wang |
| 8,917,439 B2 | 12/2014 | Wang |
| 8,963,903 B2 | 2/2015 | Sakamoto |
| 8,964,282 B2 | 2/2015 | Wang |
| 8,976,444 B2 | 3/2015 | Zhang |
| 8,988,764 B2 | 3/2015 | Abe |
| 9,013,516 B2 | 4/2015 | Sakamoto |
| 9,013,783 B2 | 4/2015 | Sprague |
| 9,052,564 B2 | 6/2015 | Sprague |
| 9,140,952 B2 | 9/2015 | Sprague |
| 9,146,439 B2 | 9/2015 | Zhang |
| 9,170,468 B2 | 10/2015 | Lin |
| 9,251,736 B2 | 2/2016 | Lin |
| 9,285,649 B2 | 3/2016 | Du |
| 9,293,511 B2 | 3/2016 | Jacobson |
| 9,360,733 B2 | 6/2016 | Wang |
| 9,460,666 B2 | 10/2016 | Sprague |
| 9,513,527 B2 | 12/2016 | Chan |
| 9,541,814 B2 | 1/2017 | Lin |
| 9,640,119 B2 | 5/2017 | Lin |
| 9,671,668 B2 | 6/2017 | Chan |
| 9,761,181 B2 | 9/2017 | Chan |
| 9,812,073 B2 | 11/2017 | Lin |
| 9,922,603 B2 | 3/2018 | Lin |
| 2001/0035926 A1 | 11/2001 | Yamaguchi | |
| 2003/0231162 A1* | 12/2003 | Kishi | G02F 1/167 345/107 |
| 2004/0085619 A1 | 5/2004 | Wu |
| 2006/0290652 A1 | 12/2006 | Zhou |
| 2007/0002008 A1 | 1/2007 | Tam |
| 2007/0080928 A1 | 4/2007 | Ishii |
| 2007/0273637 A1 | 11/2007 | Zhou |
| 2008/0042928 A1 | 2/2008 | Schlangen |
| 2008/0062159 A1 | 3/2008 | Roh |
| 2008/0117165 A1 | 5/2008 | Machida |
| 2008/0174531 A1 | 7/2008 | Sah |
| 2008/0224989 A1 | 9/2008 | Zhou |
| 2008/0266243 A1 | 10/2008 | Johnson |
| 2009/0153942 A1 | 6/2009 | Daniel |
| 2009/0184897 A1 | 7/2009 | Miyamoto |
| 2009/0311484 A1 | 12/2009 | McLellan |
| 2010/0020384 A1* | 1/2010 | Machida | G02F 1/167 359/296 |
| 2010/0194733 A1 | 8/2010 | Lin | |
| 2011/0025681 A1* | 2/2011 | Komatsu | G02F 1/167 345/214 |
| 2011/0043543 A1 | 2/2011 | Chen |
| 2011/0175939 A1 | 7/2011 | Moriyama |
| 2011/0199671 A1 | 8/2011 | Amundson |
| 2011/0217639 A1 | 9/2011 | Sprague |
| 2011/0234557 A1 | 9/2011 | Yang | |
| 2011/0285713 A1 | 11/2011 | Swic | |
| 2012/0154899 A1* | 6/2012 | Ahn | G09G 3/344 359/296 |
| 2012/0256893 A1* | 10/2012 | Sakamoto | G09G 3/2003 345/208 |
| 2012/0299947 A1 | 11/2012 | Wang |
| 2013/0278995 A1 | 10/2013 | Drzaic |
| 2014/0009818 A1 | 1/2014 | Brochon |
| 2014/0011913 A1 | 1/2014 | Du |
| 2014/0055840 A1 | 2/2014 | Zang |
| 2015/0097877 A1 | 4/2015 | Lin |
| 2015/0103394 A1 | 4/2015 | Wang |
| 2015/0268531 A1 | 9/2015 | Wang et al. |
| 2016/0293111 A1 | 10/2016 | Lin |

FOREIGN PATENT DOCUMENTS

| | | |
|---|---|---|
| JP | 2007033710 | 2/2007 |
| JP | 2008033000 | 2/2008 |
| JP | 2008209589 | 9/2008 |
| JP | 2009116041 | 5/2009 |
| JP | 2009145751 | 7/2009 |
| JP | 2009192637 | 8/2009 |
| JP | 2011158783 | 8/2011 |
| JP | 2013250325 | 12/2013 |
| KR | 20070082680 | 8/2007 |
| KR | 20110103765 | 9/2011 |
| TW | 200938928 | 9/2009 |
| TW | 201122697 | 7/2011 |

OTHER PUBLICATIONS

Sprague, R.A. ( May 18, 2011) Active Matrix Displays for e-readers Using Microcup Electrophoretic. Presentation conducted at SID 2011, 49 Int'l Symposium, Seminar and Exhibition, May 15-May 20, 2011, Los Angeles Convention Center, CA.

Kao, W.C., (Feb. 2009) Configurable Timing Controller Design for Active Matrix Electrophoretic Display. IEEE Transactions on Consumer Electronics, 2009, vol. 55, Issue 1, pp. 1-5.

Kao, W.C., Ye, J.A., Lin, F.S., Lin, C. and Sprague, R. (Jan. 2009) Configurable Timing Controller Design for Active Matrix Electrophoretic Display with 16 Gray Levels. ICCE 2009 Digest of Technical Papers, 10.2-2.

Kao, W.C. et al. (Jan. 2008) Integrating Flexible Electrophoretic Display and One-Time Password Generator in Smart Cards. ICCE 2008 Digest of Technical Papers, p. 4-3. (International Conference on Consumer Electronics, Jan. 9-13, 2008).

Federal Institute of Industrial Property, PCT/US2016/025504, International Search Report and Written Opinion, Russian Federation, dated Aug. 18, 2016.

PCT/US15/60178, PCT Notification of Transmittal of the International Search Report and the Written Opinion of the International Searching Authority, or the Declaration, dated Feb. 18, 2016.

Korean Intellectual Property Office; PCT/US2014/038247; International Search Report and Written Opinion; dated Sep. 2, 2014.

European Patent Office; EP Appl. No. 14797565.0 ; Extended European Search Report; dated Dec. 15, 2016.

European Patent Office, EP Appl. No. 15860337.3, European Search Report, dated Mar. 21, 2018.

\* cited by examiner

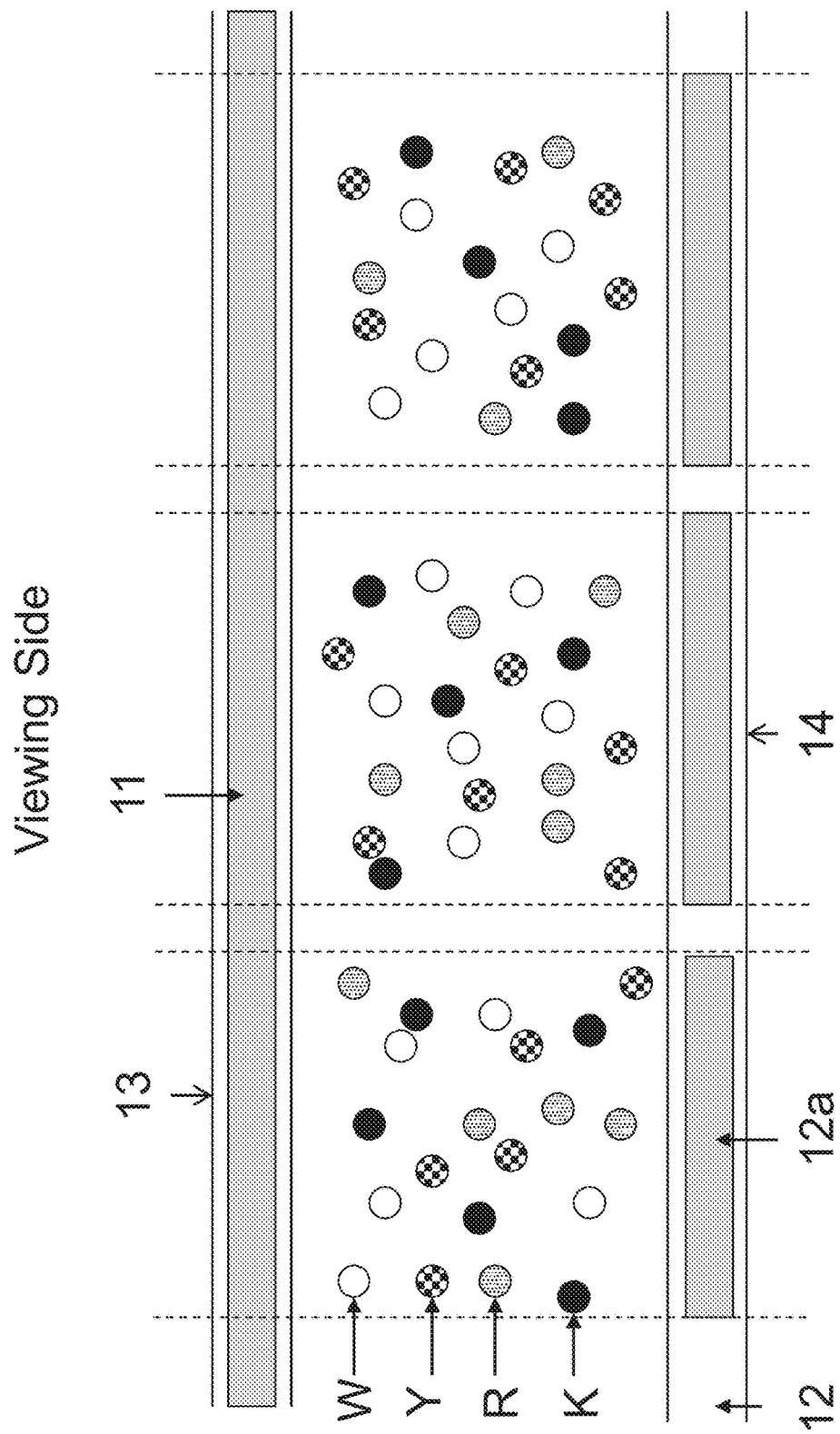

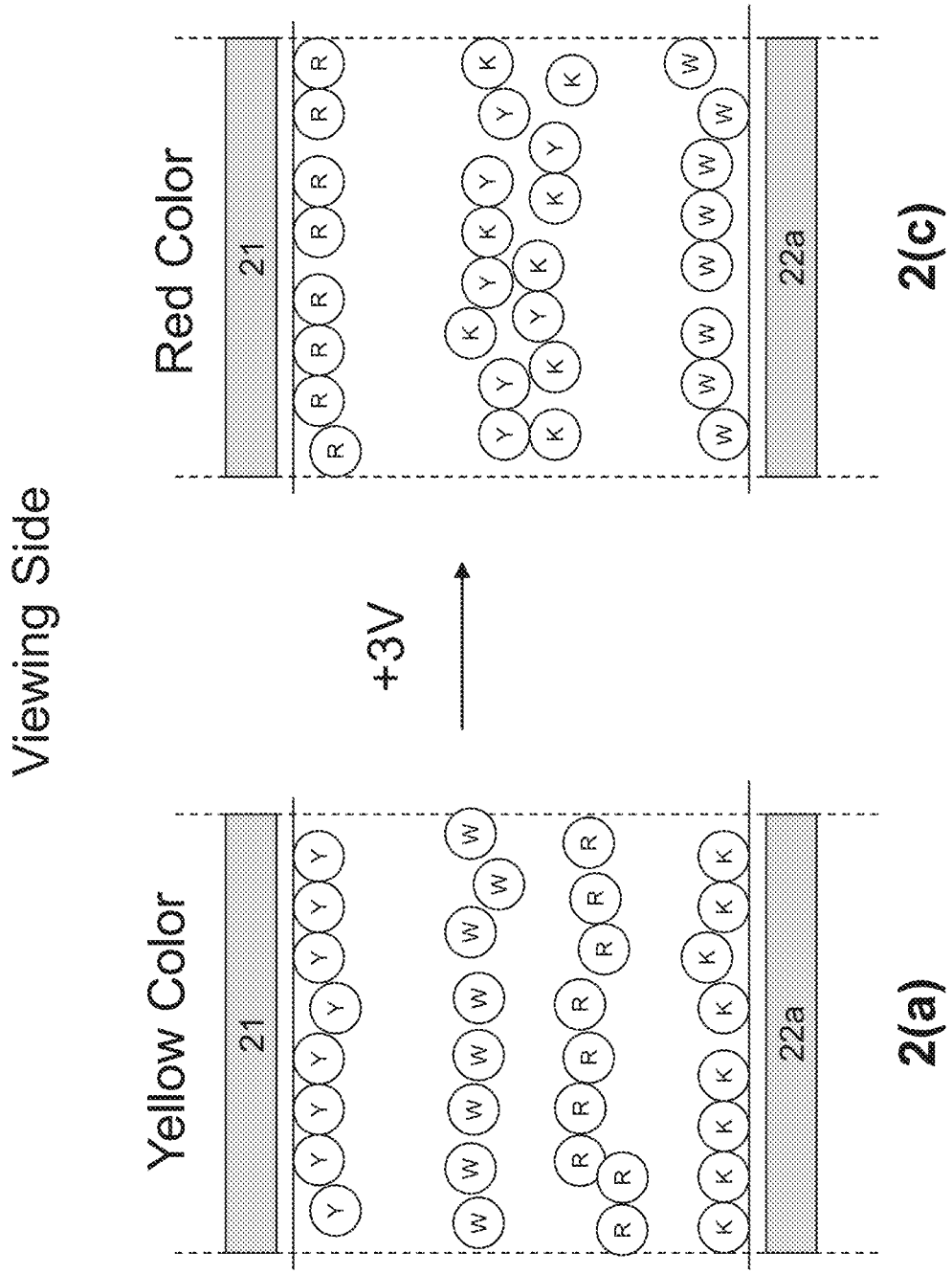

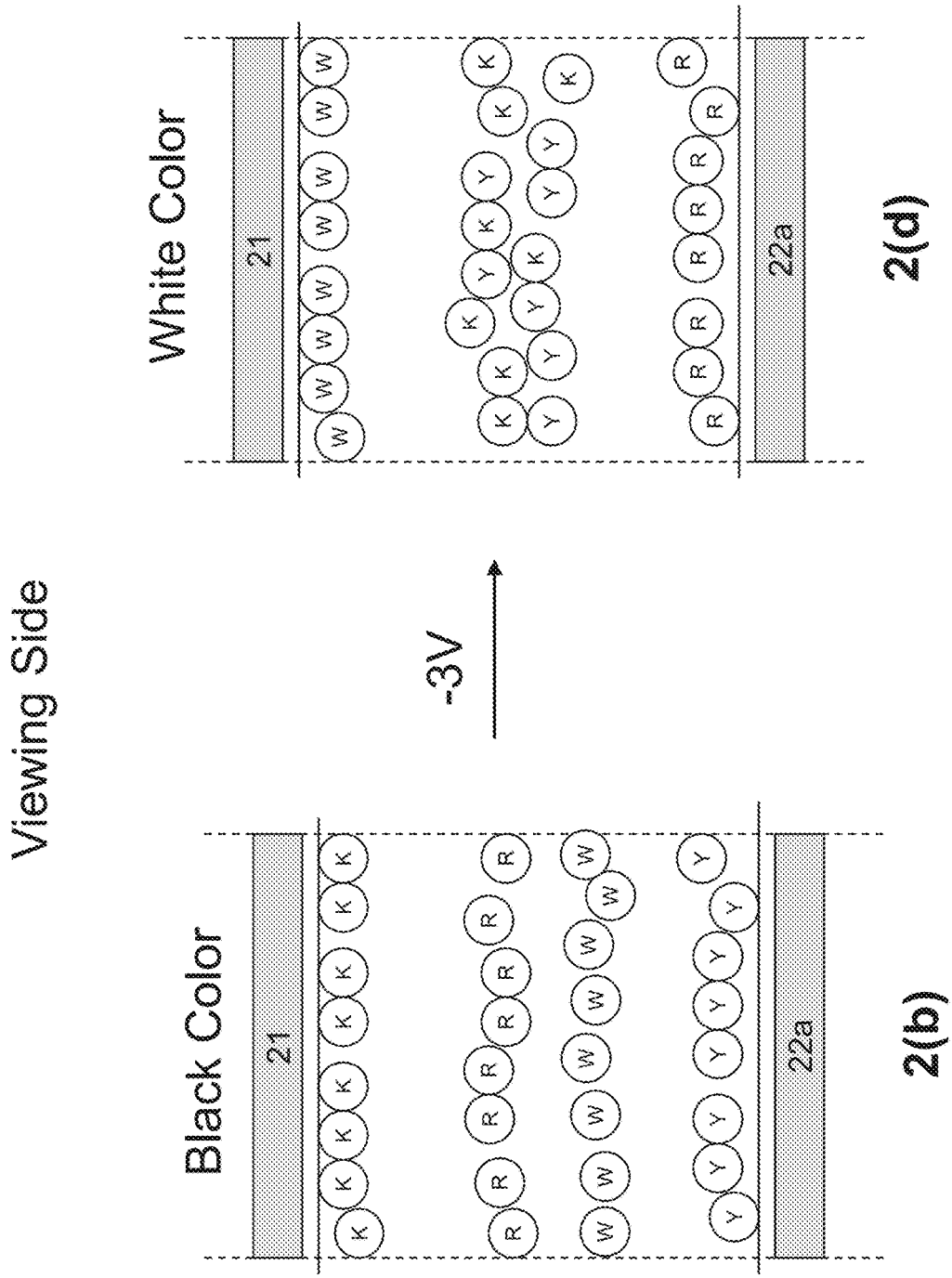

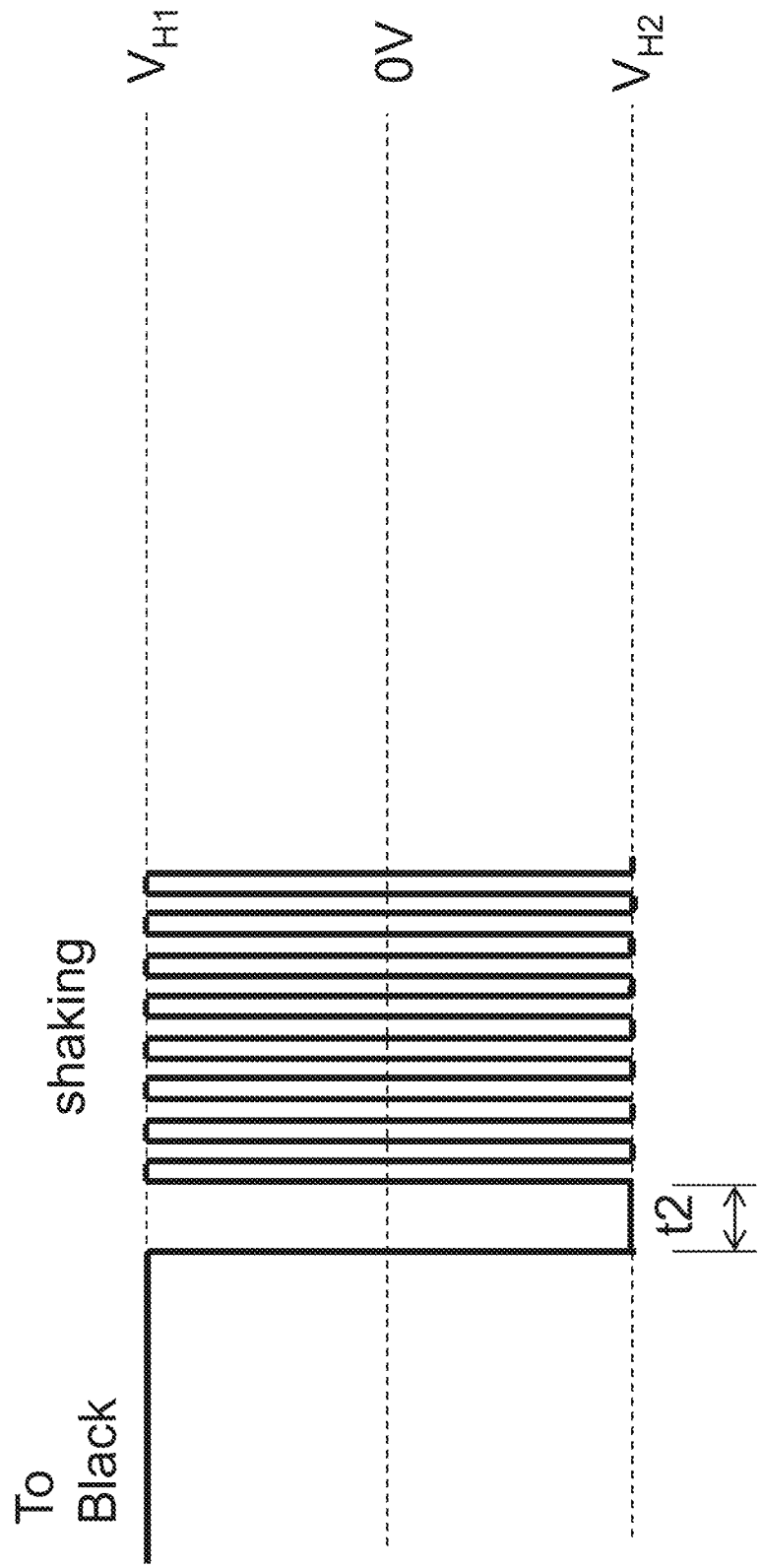

METHODS FOR DRIVING FOUR PARTICLE ELECTROPHORETIC DISPLAY

RELATED APPLICATIONS

This application is a continuation of U.S. patent application Ser. No. 15/724,718, filed Oct. 4, 2017, and published as U.S. Patent Publication No. 2018/0053472, which is a continuation-in-part of U.S. patent application Ser. No. 14/939,666, filed Nov. 12, 2015, now U.S. Pat. No. 9,812,073, issued Nov. 7, 2017, which claims priority to U.S. Provisional Application No. 62/080,845, filed Nov. 17, 2014. The contents of all patents and patent applications recited in this application are incorporated herein by reference in their entireties.

FIELD OF THE INVENTION

The present invention is directed to driving methods for a color display device in which each pixel can display four high-quality color states.

BACKGROUND OF THE INVENTION

In order to achieve a color display, color filters are often used. The most common approach is to add color filters on top of black/white sub-pixels of a pixelated display to display the red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When the black state is desired, all three-sub-pixels are turned to the black state. When the white state is desired, the three sub-pixels are turned to red, green and blue, respectively, and as a result, a white state is seen by the viewer.

The biggest disadvantage of such a technique is that since each of the sub-pixels has a reflectance of about one third of the desired white state, the white state is fairly dim. To compensate this, a fourth sub-pixel may be added which can display only the black and white states, so that the white level is doubled at the expense of the red, green or blue color level (where each sub-pixel is only one fourth of the area of the pixel). Even with this approach, the white level is normally substantially less than half of that of a black and white display, rendering it an unacceptable choice for display devices, such as e-readers or displays that need well readable black-white brightness and contrast.

SUMMARY OF THE INVENTION

A first aspect of the present invention is directed to a driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein
  (a) the four types of pigment particles have optical characteristics differing from one another;
  (b) the first type of particles carry high positive charge and the second type of particles carry high negative charge; and
  (c) the third type of particles carry low positive charge and the fourth type of particles carry low negative charge,
the method comprises the following steps:
  (i) applying a first driving voltage to a pixel in the electrophoretic display for a first period of time to drive the pixel towards the color state of the first or second type of particles at the viewing side; and
  (ii) applying a second driving voltage to the pixel for a second period of time, wherein the second driving voltage has polarity opposite that of the first driving voltage and an amplitude lower than that of the first driving voltage, to drive the pixel from the color state of the first type of particles towards the color state of the fourth type of particles or from the color state of the second type of particle towards the color state of the third type of particles, at the viewing side.

A second aspect of the present invention is directed to a driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;
  (b) the first type of particles carry high positive charge and the second type of particles carry high negative charge; and
  (c) the third type of particles carry low positive charge and the fourth type of particles carry low negative charge,
the method comprises the following steps:
  (i) applying a first driving voltage to a pixel in the electrophoretic display for a first period of time to drive the pixel towards the color state of the first or second type of particles at the viewing side;
  (ii) applying a second driving voltage to the pixel for a second period of time, wherein the second period of time is greater than the first period of time, the second driving voltage has polarity opposite that of the first driving voltage and the second driving voltage has an amplitude lower than that of the first driving voltage, to drive the pixel from the color state of the first type of particles towards the color state of the fourth type of particles or from the color state of the second type of particle towards the color state of the third type of particles, at the viewing side; and
repeating steps (i) and (ii).

A third aspect of the present invention is directed to a driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein
  (a) the four types of pigment particles have optical characteristics differing from one another;
  (b) the first type of particles carry high positive charge and the second type of particles carry high negative charge; and (c) the third type of particles carry low positive charge and the fourth type of particles carry low negative charge, the method comprises the following steps:
  (i) applying a first driving voltage to a pixel in the electrophoretic display for a first period of time to drive the pixel towards the color state of the first type or second type of particles at the viewing side;
  (ii) applying a second driving voltage to the pixel for a second period of time, wherein the second period of time is greater than the first period of time, the second driving voltage has polarity opposite that of the first driving voltage and the second driving voltage has an amplitude lower than that of the first driving voltage, to drive the pixel from the color state of the first type of particles towards the color state of the fourth type of particles or from the color state of the second type of particle towards the color state of the third type of particles, at the viewing side;
  (iii) applying no driving voltage to the pixel for a third period of time; and repeating steps (i)-(iii).

A fourth aspect of the present invention is directed to a driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein
  (a) the four types of pigment particles have optical characteristics differing from one another;
  (b) the first type of particles carry high positive charge and the second type of particles carry high negative charge; and
  (c) the third type of particles carry low positive charge and the fourth type of particles carry low negative charge,
the method comprises the following steps:
  (i) applying a first driving voltage to a pixel in the electrophoretic display for a first period of time to drive the pixel towards the color state of the first or second type of particles at the viewing side;
  (ii) applying no driving voltage to the pixel for a second period of time;
  (iii) applying a second driving voltage to the pixel for a third period of time, wherein the third period of time is greater than the first period of time, the second driving voltage has polarity opposite that of the first driving voltage and the second driving voltage has an amplitude lower than that of the first driving voltage, to drive the pixel from the color state of the first type of particles towards the color state of the fourth type of particles or from the color state of the second type of particles towards the color state of the third type of particles, at the viewing side;
  (iv) applying no driving voltage to the pixel for a fourth period of time; and repeating steps (i)-(iv).

The fourth aspect of the present invention may further comprise the following steps:
  (v) applying a third driving voltage to the pixel for a fifth period of time, wherein the third driving voltage has polarity same as that of the first driving voltage;
  (vi) applying a fourth driving voltage to the pixel for a sixth period of time, wherein the fifth period of time is shorter than the sixth period of time and the fourth driving voltage has polarity opposite that of the first driving voltage to drive the pixel from the color state of the first type of particles towards the color state of the fourth type of particles or from the color state of the second type of particles towards the color state of the third type of particles, at the viewing side;
  (vii) applying no driving voltage for a seventh period of time; and repeating steps (v)-(vii).

BRIEF DESCRIPTION OF THE DRAWINGS

FIG. 1 depicts a display layer capable of displaying four different color states.

FIGS. 2-1 to 2-3 illustrate an example of the present invention.

FIG. 3 shows a shaking waveform which may be incorporated into the driving methods.

FIG. 31 illustrates an alternative driving method of the present invention.

DETAILED DESCRIPTION OF THE INVENTION

The electrophoretic fluid related to the present invention comprises two pairs of oppositely charged particles. The first pair consists of a first type of positive particles and a first type of negative particles and the second pair consists of a second type of positive particles and a second type of negative particles.

In the two pairs of oppositely charged particles, one pair carries a stronger charge than the other pair. Therefore the four types of particles may also be referred to as high positive particles, high negative particles, low positive particles and low negative particles.

Figures 1, 2:
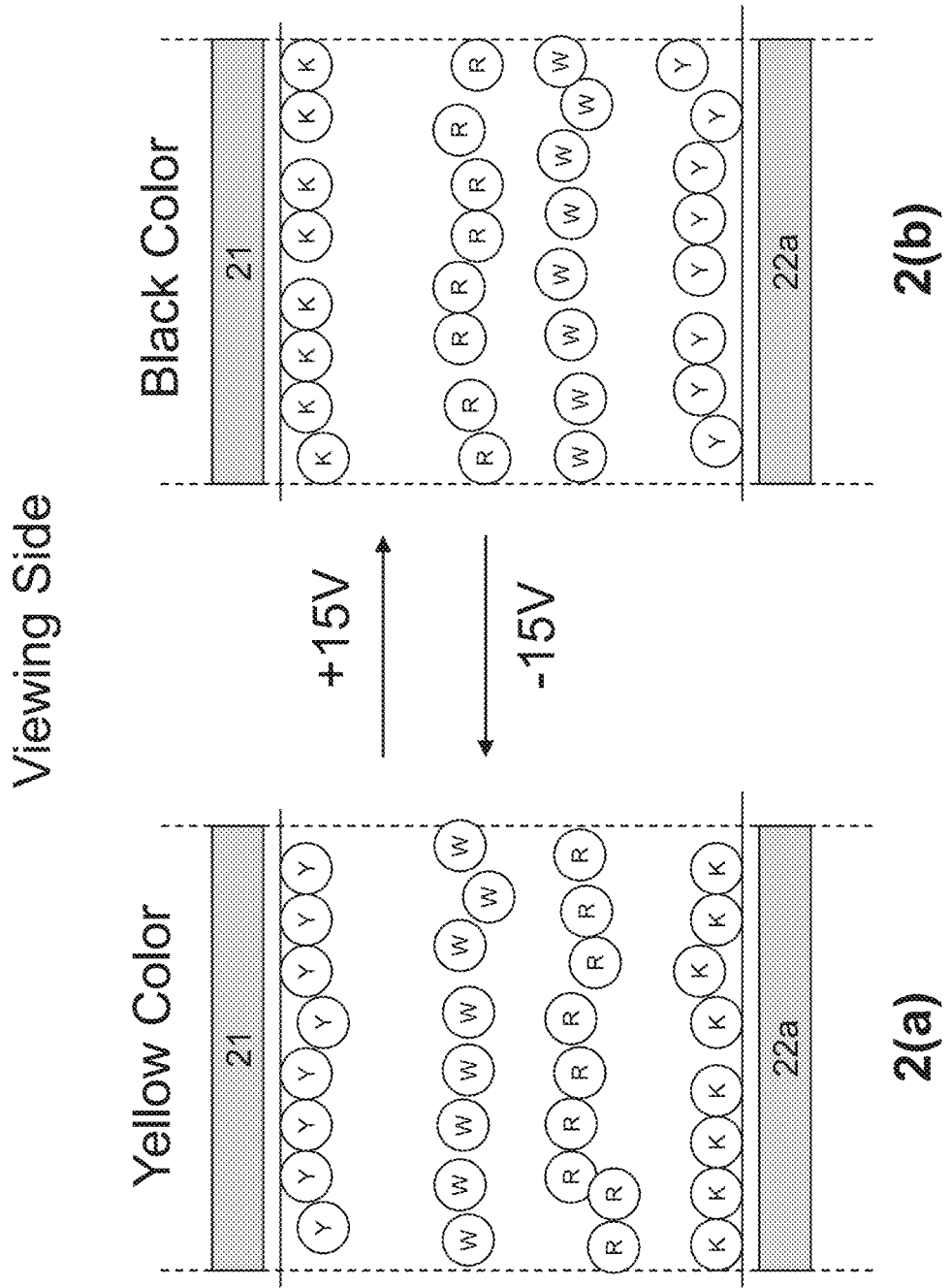

As an example shown in FIG. 1, the black particles (K) and yellow particles (Y) are the first pair of oppositely charged particles, and in this pair, the black particles are the high positive particles and the yellow particles are the high negative particles. The red particles (R) and the white particles (W) are the second pair of oppositely charged particles, and in this pair, the red particles are the low positive particles and the white particles are the low negative particles.

In another example not shown, the black particles may be the high positive particles; the yellow particles may be the low positive particles; the white particles may be the low negative particles and the red particles may be the high negative particles.

In addition, the color states of the four types of particles may be intentionally mixed. For example, because yellow pigment by nature often has a greenish tint and if a better yellow color state is desired, yellow particles and red particles may be used where both types of particles carry the same charge polarity and the yellow particles are higher charged than the red particles. As a result, at the yellow state, there will be a small amount of the red particles mixed with the greenish yellow particles to cause the yellow state to have better color purity.

It is understood that the scope of the invention broadly encompasses particles of any colors as long as the four types of particles have visually distinguishable colors.

For the white particles, they may be formed from an inorganic pigment, such as $TiO_2$, $ZrO_2$, $ZnO$, $Al_2O_3$, $Sb_2O_3$, $BaSO_4$, $PbSO_4$ or the like.

For the black particles, they may be formed from CI pigment black 26 or 28 or the like (e.g., manganese ferrite black spinel or copper chromite black spinel) or carbon black.

Particles of non-white and non-black colors are independently of a color, such as, red, green, blue, magenta, cyan or yellow. The pigments for color particles may include, but are not limited to, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

The color particles may also be inorganic pigments, such as red, green, blue and yellow. Examples may include, but are not limited to, CI pigment blue 28, CI pigment green 50 and CI pigment yellow 227.

In addition to the colors, the four types of particles may have other distinct optical characteristics, such as optical transmission, reflectance, luminescence or, in the case of displays intended for machine reading, pseudo-color in the sense of a change in reflectance of electromagnetic wavelengths outside the visible range.

A display layer utilizing the display fluid of the present invention has two surfaces, a first surface (13) on the viewing side and a second surface (14) on the opposite side of the first surface (13). The display fluid is sandwiched between the two surfaces. On the side of the first surface (13), there is a common electrode (11) which is a transparent electrode layer (e.g., ITO), spreading over the entire top of the display layer. On the side of the second surface (14), there is an electrode layer (12) which comprises a plurality of pixel electrodes (12*a*).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in FIG. 1 denotes a pixel. As shown, each pixel has a corresponding pixel electrode. An electric field is created for a pixel by the potential difference between a voltage applied to the common electrode and a voltage applied to the corresponding pixel electrode.

The solvent in which the four types of particles are dispersed is clear and colorless. It preferably has a low viscosity and a dielectric constant in the range of about 2 to about 30, preferably about 2 to about 15 for high particle mobility.

Examples of suitable dielectric solvent include hydrocarbons such as Isopar®, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC −200).

In one embodiment, the charge carried by the "low charge" particles may be less than about 50%, preferably about 5% to about 30%, of the charge carried by the "high charge" particles. In another embodiment, the "low charge" particles may be less than about 75%, or about 15% to about 55%, of the charge carried by the "high charge" particles. In a further embodiment, the comparison of the charge levels as indicated applies to two types of particles having the same charge polarity.

The charge intensity may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow-through cell for determination of the zeta potential.

The amplitudes of the "high positive" particles and the "high negative" particles may be the same or different. Likewise, the amplitudes of the "low positive" particles and the "low negative" particles may be the same or different.

It is also noted that in the same fluid, the two pairs of high-low charge particles may have different levels of charge differentials. For example, in one pair, the low positive charged particles may have a charge intensity which is 30% of the charge intensity of the high positive charged particles and in another pair, the low negative charged particles may have a charge intensity which is 50% of the charge intensity of the high negative charged particles.

The following is an example illustrating a display device utilizing such a display fluid.

Example

This example is demonstrated in FIG. 2. The high positive particles are of a black color (K); the high negative particles are of a yellow color (Y); the low positive particles are of a red color (R); and the low negative particles are of a white color (W).

In FIG. 2(a), when a high negative voltage potential difference (e.g., −15V) is applied to a pixel for a time period of sufficient length, an electric field is generated to cause the yellow particles (Y) to be pushed to the common electrode (21) side and the black particles (K) pulled to the pixel electrode (22a) side. The red (R) and white (W) particles, because they carry weaker charges, move slower than the higher charged black and yellow particles and as a result, they stay in the middle of the pixel, with white particles above the red particles. In this case, a yellow color is seen at the viewing side.

In FIG. 2(b), when a high positive voltage potential difference (e.g., +15V) is applied to the pixel for a time period of sufficient length, an electric field of an opposite polarity is generated which causes the particle distribution to be opposite of that shown in FIG. 2(a) and as a result, a black color is seen at the viewing side.

In FIG. 2(c), when a lower positive voltage potential difference (e.g., +3V) is applied to the pixel of FIG. 2(a) (that is, driven from the yellow state) for a time period of sufficient length, an electric field is generated to cause the yellow particles (Y) to move towards the pixel electrode (22a) while the black particles (K) move towards the common electrode (21). However, when they meet in the middle of the pixel, they slow down significantly and remain there because the electric field generated by the low driving voltage is not strong enough to overcome the strong attraction between them. On the other hand, the electric field generated by the low driving voltage is sufficient to separate the weaker charged white and red particles to cause the low positive red particles (R) to move all the way to the common electrode (21) side (i.e., the viewing side) and the low negative white particles (W) to move to the pixel electrode (22a) side. As a result, a red color is seen. It is also noted that in this figure, there are also attraction forces between weaker charged particles (e.g., R) with stronger charged particles of opposite polarity (e.g., Y). However, these attraction forces are not as strong as the attraction force between two types of stronger charged particles (K and Y) and therefore they can be overcome by the electric field generated by the low driving voltage. In other words, weaker charged particles and the stronger charged particles of opposite polarity can be separated.

In FIG. 2(d), when a lower negative voltage potential difference (e.g., −3V) is applied to the pixel of FIG. 2(b) (that is, driven from the black state) for a time period of sufficient length, an electric field is generated which causes the black particles (K) to move towards the pixel electrode (22a) while the yellow particles (Y) move towards the common electrode (21). When the black and yellow particles meet in the middle of the pixel, they slow down significantly and remain there because the electric field generated by the low driving voltage is not sufficient to overcome the strong attraction between them. At the same time, the electric field generated by the low driving voltage is sufficient to separate the white and red particles to cause the low negative white particles (W) to move all the way to the common electrode side (i.e., the viewing side) and the low positive red particles (R) move to the pixel electrode side. As a result, a white color is seen. It is also noted that in this figure, there are also attraction forces between weaker charged particles (e.g., W) with stronger charged particles of opposite polarity (e.g., K). However, these attraction forces are not as strong as the attraction force between two types of stronger charged particles (K and Y) and therefore they can be overcome by the electric field generated by the low driving voltage. In other words, weaker charged particles and the stronger charged particles of opposite polarity can be separated.

Although in this example, the black particles (K) is demonstrated to carry a high positive charge, the yellow particles (Y) to carry a high negative charge, the red (R) particles to carry a low positive charge and the white particles (W) to carry a low negative charge, in practice, the particles carry a high positive charge, or a high negative charge, or a low positive charge or a low negative charge may be of any colors. All of these variations are intended to be within the scope of this application.

It is also noted that the lower voltage potential difference applied to reach the color states in FIGS. 2(c) and 2(d) may be about 5% to about 50% of the full driving voltage potential difference required to drive the pixel from the color state of high positive particles to the color state of the high negative particles, or vice versa.

The electrophoretic fluid as described above is filled in display cells. The display cells may be cup-like microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. All of these are within the scope of the present application.

Figure 3:
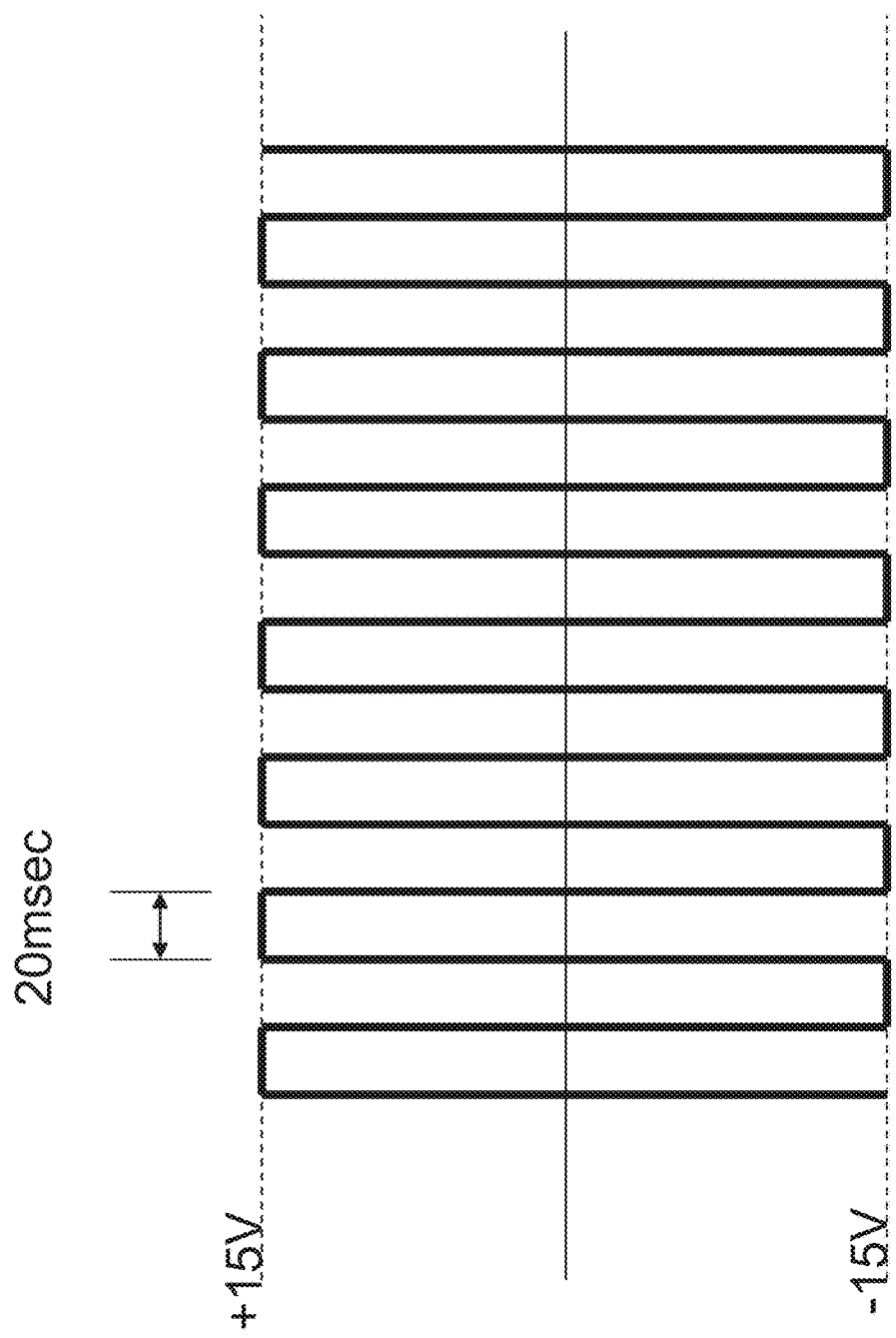

In order to ensure both color brightness and color purity, a shaking waveform, prior to driving from one color state to another color state, may be used. The shaking waveform consists of repeating a pair of opposite driving pulses for many cycles. For example, the shaking waveform may consist of a +15V pulse for 20 msec and a −15V pulse for 20 msec and such a pair of pulses is repeated for 50 times. The total time of such a shaking waveform would be 2000 msec (see FIG. 3).

In practice, there may be at least 10 repetitions (i.e., ten pairs of positive and negative pulses).

The shaking waveform may be applied regardless of the optical state (black, white, red or yellow) before a driving voltage is applied. After the shaking waveform is applied, the optical state would not be a pure white, pure black, pure yellow or pure red. Instead, the color state would be from a mixture of the four types of pigment particles.

Each of the driving pulse in the shaking waveform is applied for not exceeding 50% (or not exceeding 30%, 10% or 5%) of the driving time required from the full black state to the full yellow state, or vice versa, in the example. For example, if it takes 300 msec to drive a display device from a full black state to a full yellow state, or vice versa, the shaking waveform may consist of positive and negative pulses, each applied for not more than 150 msec. In practice, it is preferred that the pulses are shorter.

The shaking waveform as described may be used in the driving methods of the present invention.

It is noted that in all of the drawings throughout this application, the shaking waveform is abbreviated (i.e., the number of pulses is fewer than the actual number).

In addition, in the context of the present application, a high driving voltage ($V_{H1}$ or $V_{H2}$) is defined as a driving voltage which is sufficient to drive a pixel from the color state of high positive particles to the color state of high negative particles, or vice versa (see FIGS. 2a and 2b). In this scenario as described, a low driving voltage ($V_{L1}$ or $V_{L2}$) is defined as a driving voltage which may be sufficient to drive a pixel to the color state of weaker charged particles from the color state of higher charged particles (see FIGS. 2c and 2d).

In general, the amplitude of $V_L$ (e.g., $V_{L1}$ or $V_{L2}$) is less than 50%, or preferably less than 40%, of the amplitude of $V_H$ (e.g., $V_{H1}$ or $V_{H2}$).

Figure 4:
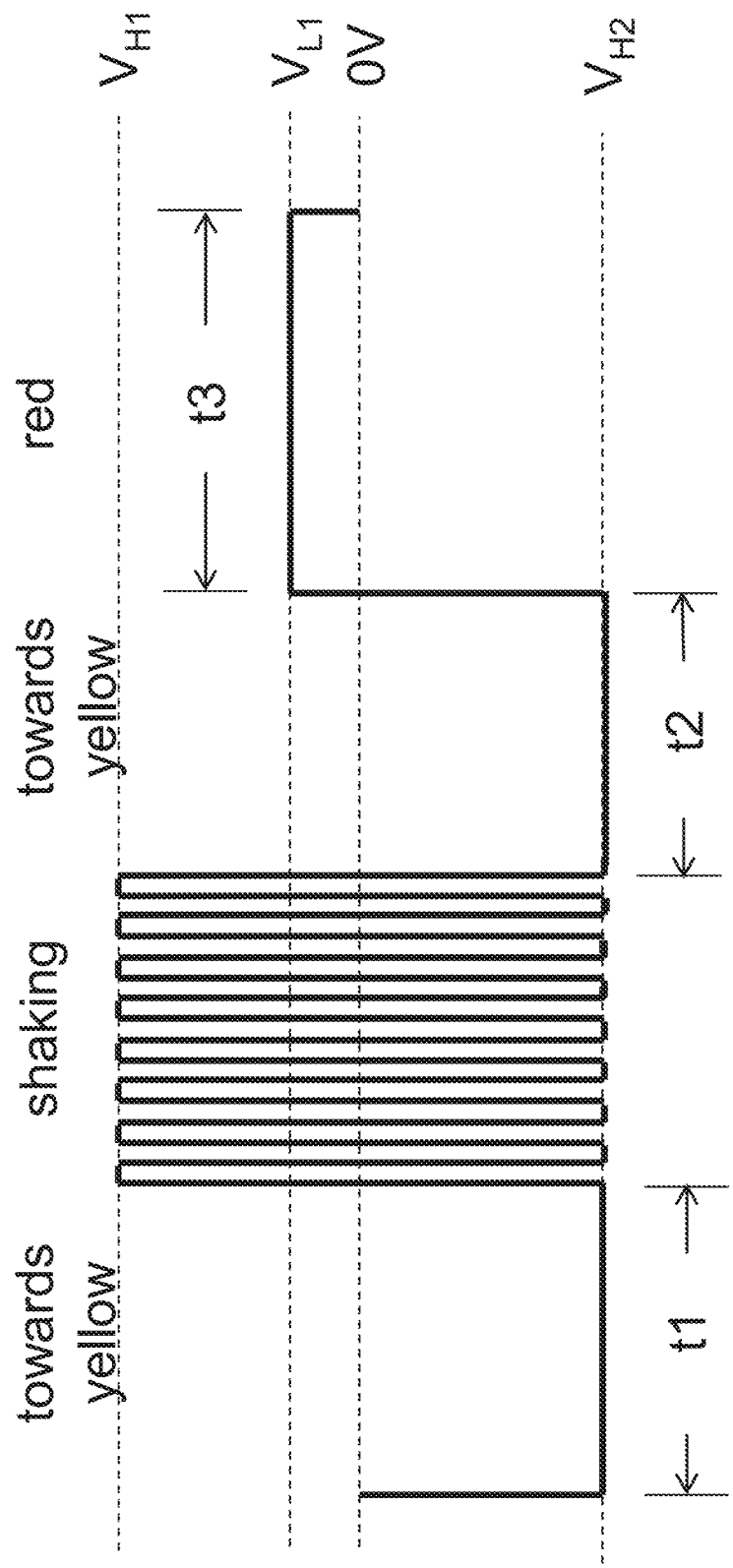
FIGS. 4 and 5 illustrate the first driving method of the present invention.

The First Driving Method:

Part A:

FIG. 4 illustrates a driving method to drive a pixel from a yellow color state (high negative) to a red color state (low positive). In this method, a high negative driving voltage ($V_{H2}$, e.g., −15V) is applied for a period of t2, to drive the pixel towards a yellow state after a shaking waveform. From the yellow state, the pixel may be driven towards the red state by applying a low positive voltage ($V_{L1}$, e.g., +5V) for a period of t3 (that is, driving the pixel from FIG. 2a to FIG. 2c). The driving period t2 is a time period sufficient to drive a pixel to the yellow state when $V_{H2}$ is applied and the driving period t3 is a time period sufficient to drive the pixel to the red state from the yellow state when $V_{L1}$ is applied. A driving voltage is preferably applied for a period of t1 before the shaking waveform to ensure DC balance. The term "DC balance", throughout this application, is intended to mean that the driving voltages applied to a pixel is substantially zero when integrated over a period of time (e.g., the period of an entire waveform).

Figure 5:
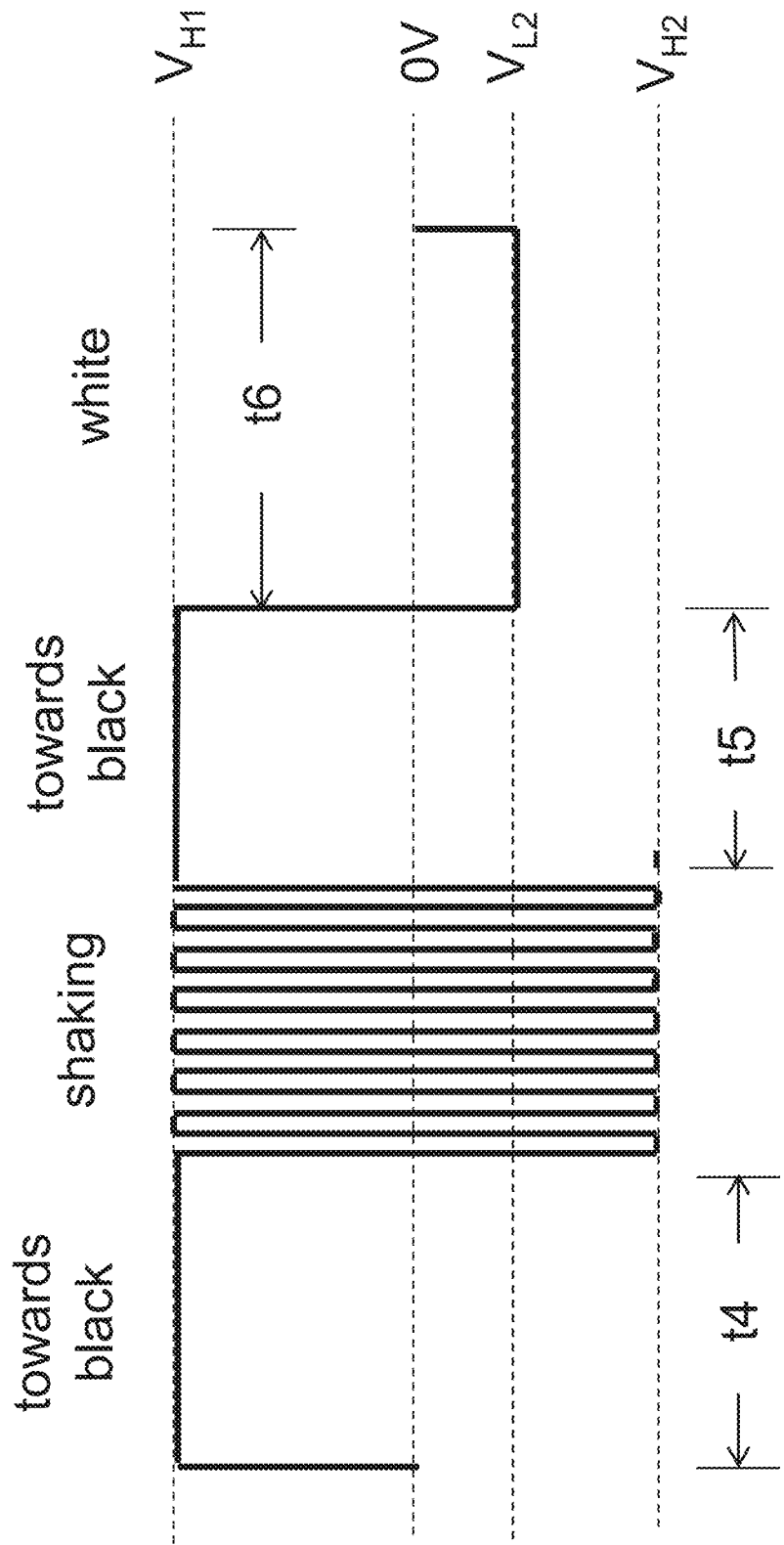

Part B:

FIG. 5 illustrates a driving method to drive a pixel from a black color state (high positive) to a white color state (low negative). In this method, a high positive driving voltage ($V_{H1}$, e.g., +15V) is applied for a period of t5, to drive the pixel towards a black state after a shaking waveform. From the black state, the pixel may be driven towards the white state by applying a low negative voltage ($V_{L2}$, e.g., −5V) for a period of t6 (that is, driving the pixel from FIG. 2b to FIG. 2d). The driving period t5 is a time period sufficient to drive a pixel to the black state when $V_{H1}$ is applied and the driving period t6 is a time period sufficient to drive the pixel to the white state from the black state when $V_{L2}$ is applied. A driving voltage is preferably applied for a period of t4 before the shaking waveform to ensure DC balance.

The entire waveform of FIG. 4 is DC balanced. In another embodiment, the entire waveform of FIG. 5 is DC balanced.

The first driving method may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;

(b) the first type of particles carry high positive charge and the second type of particles carry high negative charge; and (c) the third type of particles carry low positive charge and the fourth type of particles carry low negative charge, the method comprises the following steps:

(i) applying a first driving voltage to a pixel in the electrophoretic display for a first period of time to drive the pixel towards the color state of the first or second type of particles at the viewing side; and (ii) applying a second driving voltage to the pixel for a second period of time, wherein the second driving voltage has polarity opposite that of the first driving voltage and an amplitude lower than that of the first driving voltage, to drive the pixel from the color state of the first type of particles towards the color state of the fourth type of particles or from the color state of the second type of particle towards the color state of the third type of particles, at the viewing side.

Figure 6:
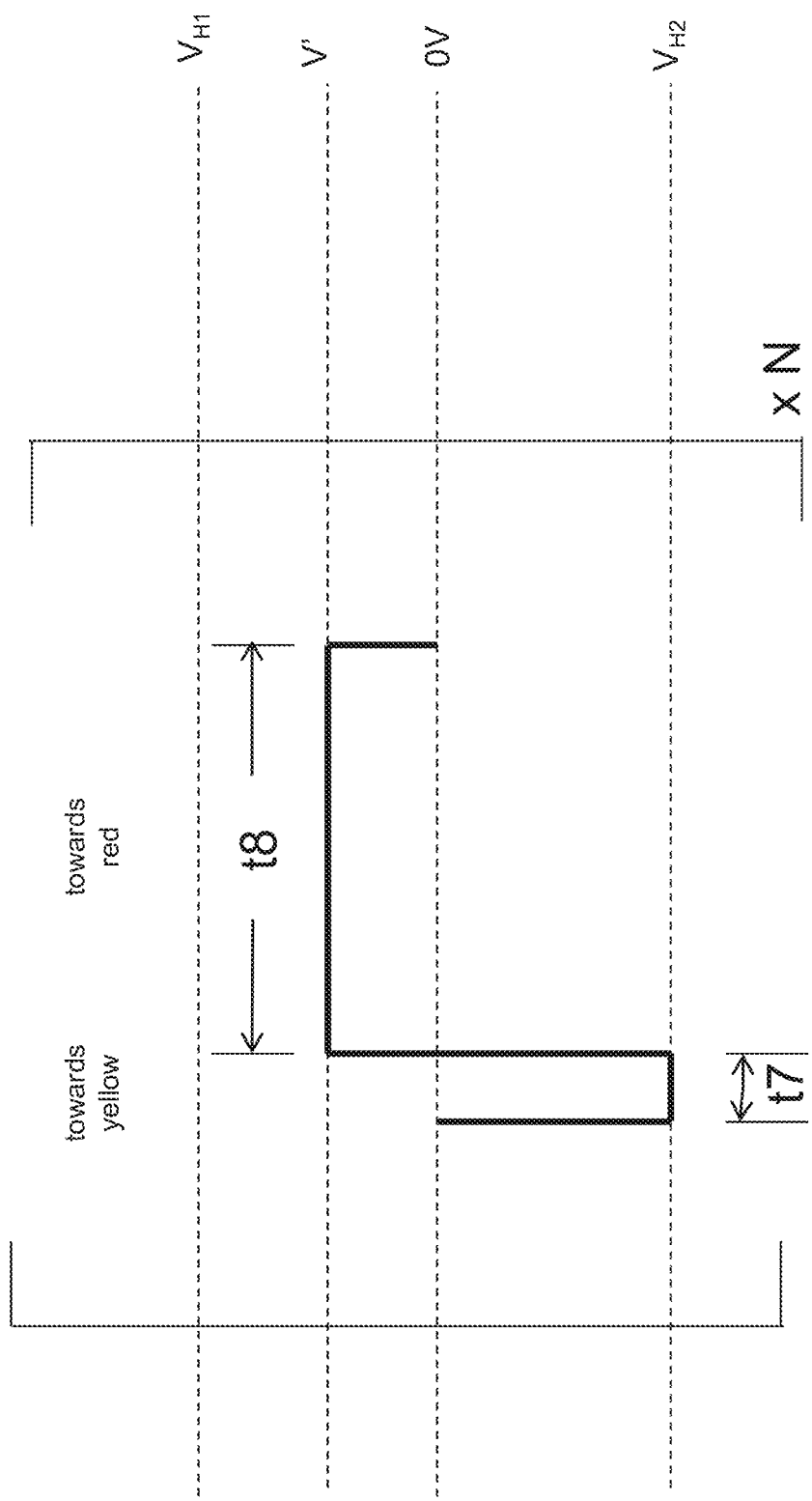
FIGS. 6 and 9 illustrate the second driving method of the present invention.

The Second Driving Method:

Part A:

The second driving method of the present invention is illustrated in FIG. 6. It relates to a driving waveform which is used to replace the driving period of t3 in FIG. 4.

In an initial step, the high negative driving voltage ($V_{H2}$, e.g., −15V) is applied for a period of t7 to push the yellow particles towards the viewing side, which is followed by a positive driving voltage (+V') for a period of t8, which pulls the yellow particles down and pushes the red particles towards the viewing side.

The amplitude of +V' is lower than that of $V_H$ (e.g., $V_{H1}$ or $V_{H2}$). In one embodiment, the amplitude of the +V' is less than 50% of the amplitude of $V_H$ (e.g., $V_{H1}$ or $V_{H2}$).

In one embodiment, t8 is greater than t7. In one embodiment, t7 may be in the range of 20-400 msec and t8 may be ≥200 msec.

The waveform of FIG. 6 is repeated for at least 2 cycles (N≥2), preferably at least 4 cycles and more preferably at least 8 cycles. The red color becomes more intense after each driving cycle.

Figure 7:
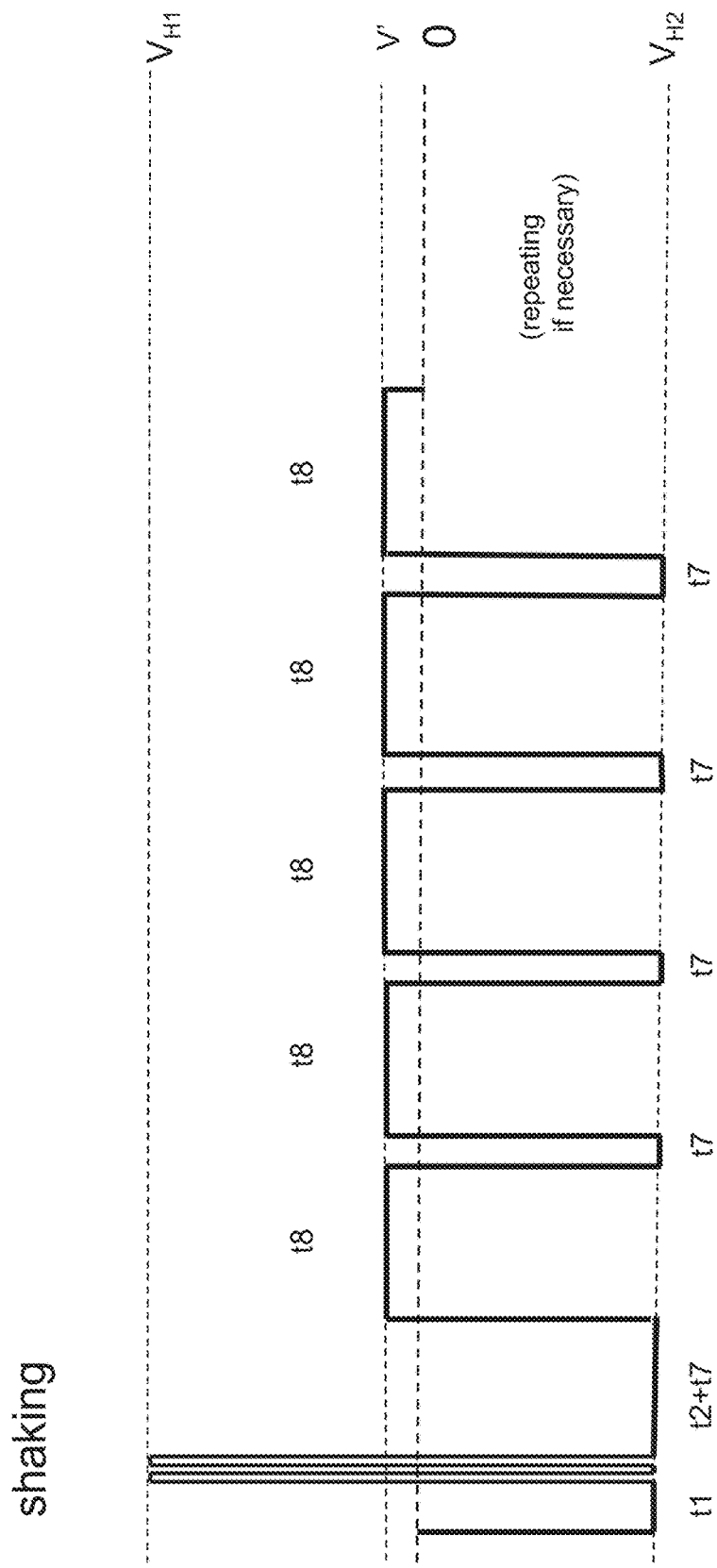
FIGS. 7, 8, 10 and 11 show driving sequences utilizing the second driving method of the present invention.

As stated, the driving waveform as shown in FIG. 6 may be used to replace the driving period of t3 in FIG. 4 (see FIG. 7). In other words, the driving sequence may be: shaking waveform, followed by driving towards the yellow state for a period of t2 and then applying the waveform of FIG. 6.

Figure 8:
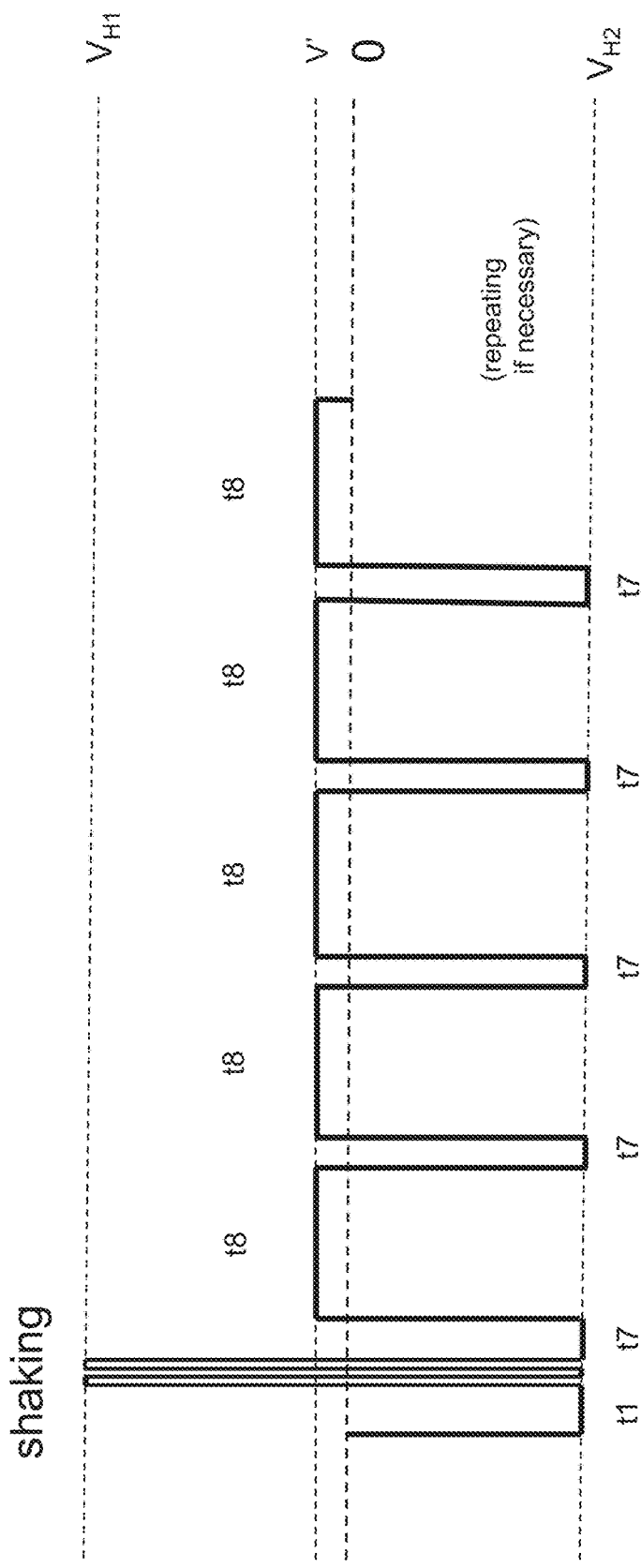

In another embodiment, the step of driving to the yellow state for a period of t2 may be eliminated and in this case, a shaking waveform is applied before applying the waveform of FIG. 6 (see FIG. 8).

In one embodiment, the entire waveform of FIG. 7 is DC balanced. In another embodiment, the entire waveform of FIG. 8 is DC balanced.

Figure 9:
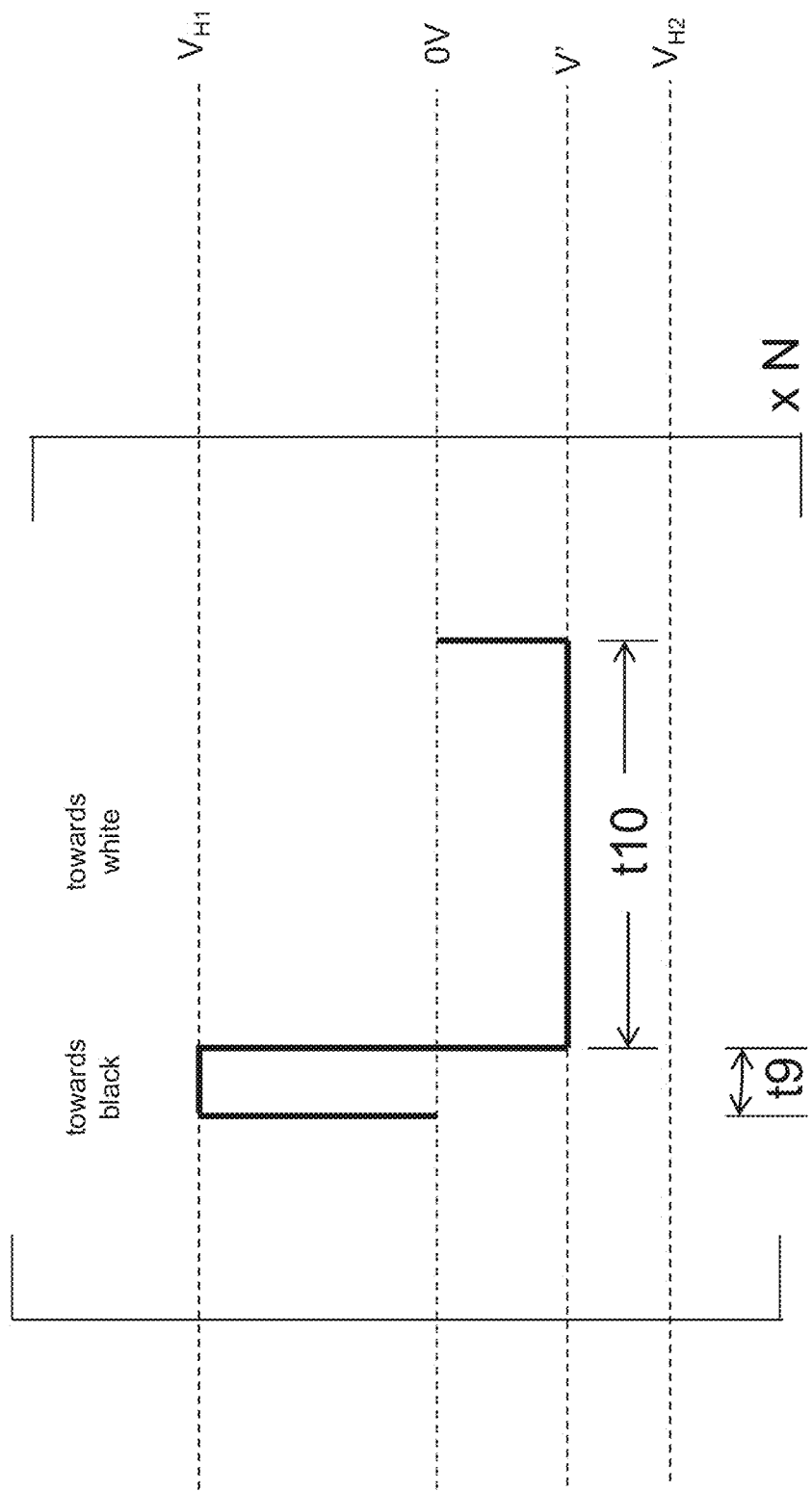

Part B:

FIG. 9 illustrates a driving waveform which is used to replace the driving period of t6 in FIG. 5.

In an initial step, a high positive driving voltage ($V_{H1}$, e.g., +15V) is applied, for a period of t9 to push the black particles towards the viewing side, which is followed by applying a negative driving voltage (−V') for a period of t10, which pulls the black particles down and pushes the white particles towards the viewing side.

The amplitude of the −V' is lower than that of $V_H$ (e.g., $V_{H1}$ or $V_{H2}$). In one embodiment, the amplitude of −V' is less than 50% of the amplitude of $V_H$ (e.g., $V_{H1}$ or $V_{H2}$).

In one embodiment, t10 is greater than t9. In one embodiment, t9 may be in the range of 20-400 msec and t10 may be ≥200 msec.

The waveform of FIG. 9 is repeated for at least 2 cycles (N≥2), preferably at least 4 cycles and more preferably at least 8 cycles. The white color becomes more intense after each driving cycle.

Figure 10:
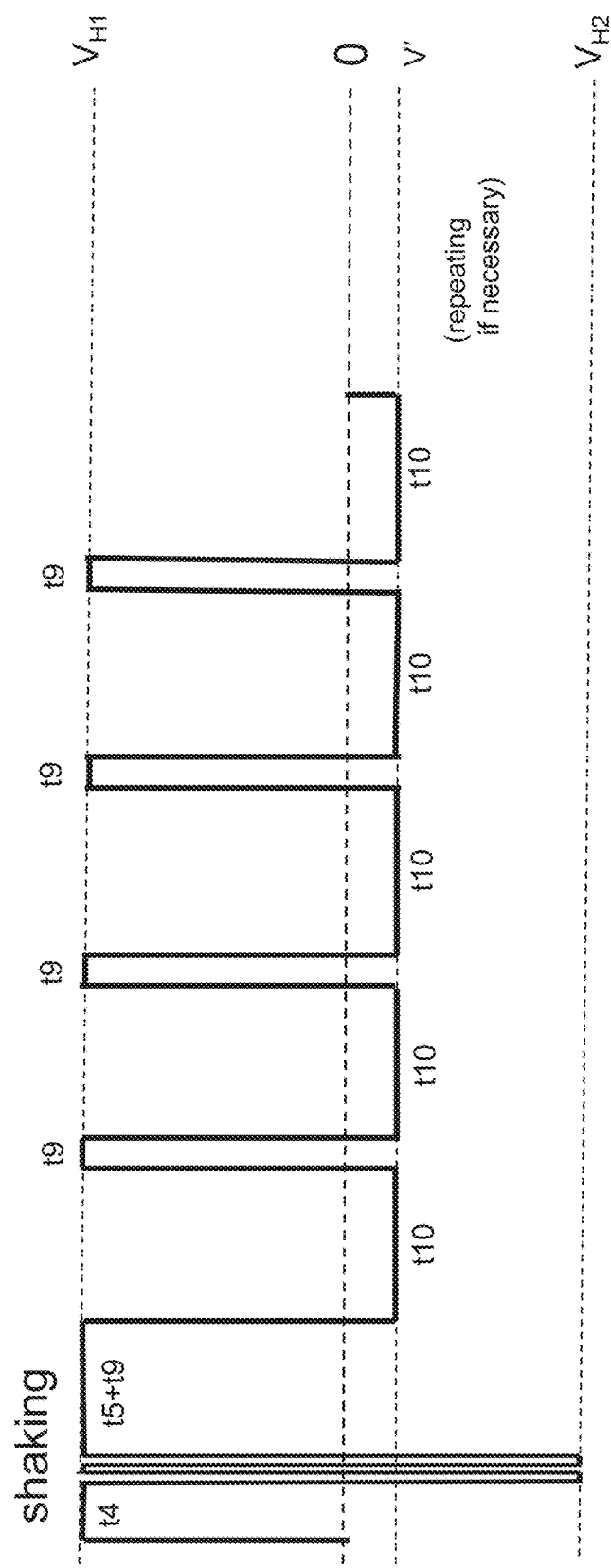

As stated, the driving waveform as shown in FIG. 9 may be used to replace the driving period of t6 in FIG. 5 (see FIG. 10). In other words, the driving sequence may be: shaking waveform, followed by driving towards the black state for a period of t5 and then applying the waveform of FIG. 9.

Figure 11:
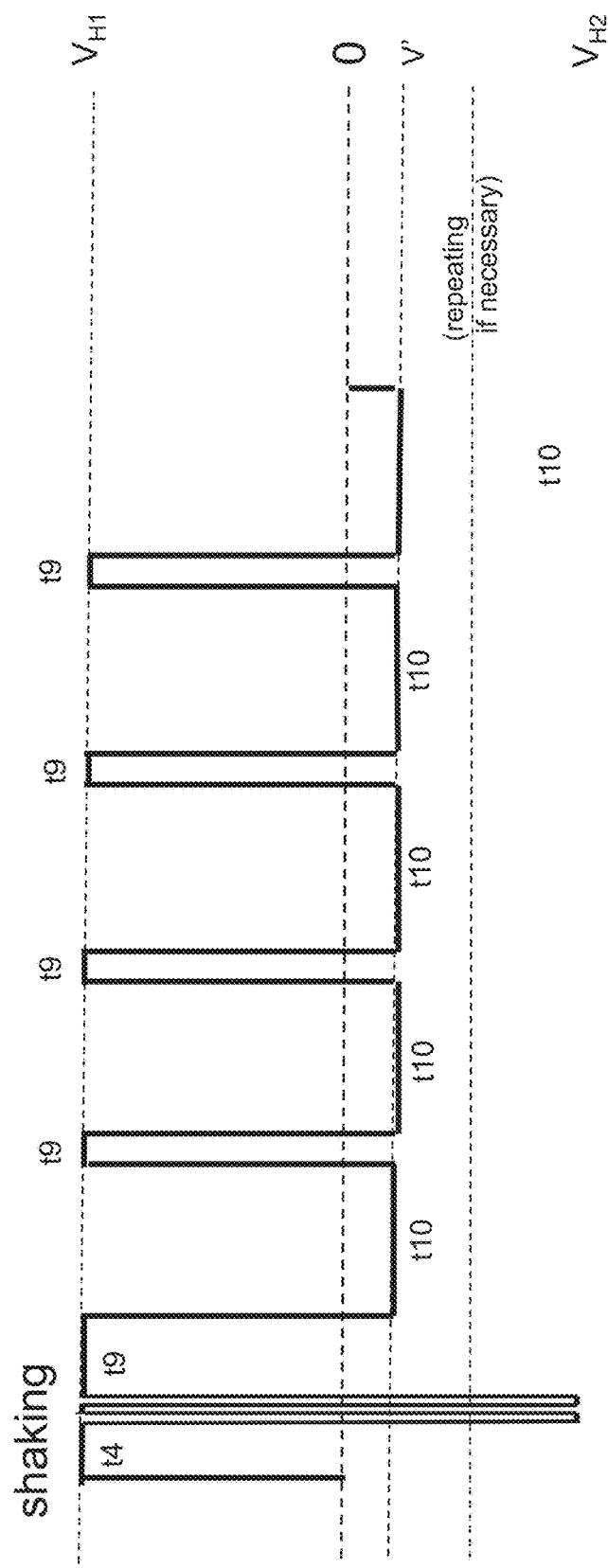

In another embodiment, the step of driving to the black state for a period of t5 may be eliminated and in this case, a shaking waveform is applied before applying the waveform of FIG. 9 (see FIG. 11).

In one embodiment, the entire waveform of FIG. 10 is DC balanced. In another embodiment, the entire waveform FIG. 11 is DC balanced.

This second driving method of the present invention may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;

(b) the first type of particles carry high positive charge and the second type of particles carry high negative charge; and (c) the third type of particles carry low positive charge and the fourth type of particles carry low negative charge, the method comprises the following steps:

(i) applying a first driving voltage to a pixel in the electrophoretic display for a first period of time to drive the pixel towards the color state of the first or second type of particles at the viewing side;

(ii) applying a second driving voltage to the pixel for a second period of time, wherein the second period of time is greater than the first period of time, the second driving voltage has polarity opposite that of the first driving voltage and the second driving voltage has an amplitude lower than that of the first driving voltage, to drive the pixel from the color state of the first type of particles towards the color state of the fourth type of particles or from the color state of the second type of particle towards the color state of the third type of particles, at the viewing side; and repeating steps (i) and (ii).

In one embodiment, the amplitude of the second driving voltage is less than 50% of the amplitude of the first driving voltage. In one embodiment, steps (i) and (ii) are repeated at least 2 times, preferably at least 4 times and more preferably at least 8 times. In one embodiment, the method further comprises a shaking waveform before step (i). In one embodiment, the method further comprises driving the pixel to the color state of the first or second type of particles after the shaking waveform but prior to step (i).

Figure 12:
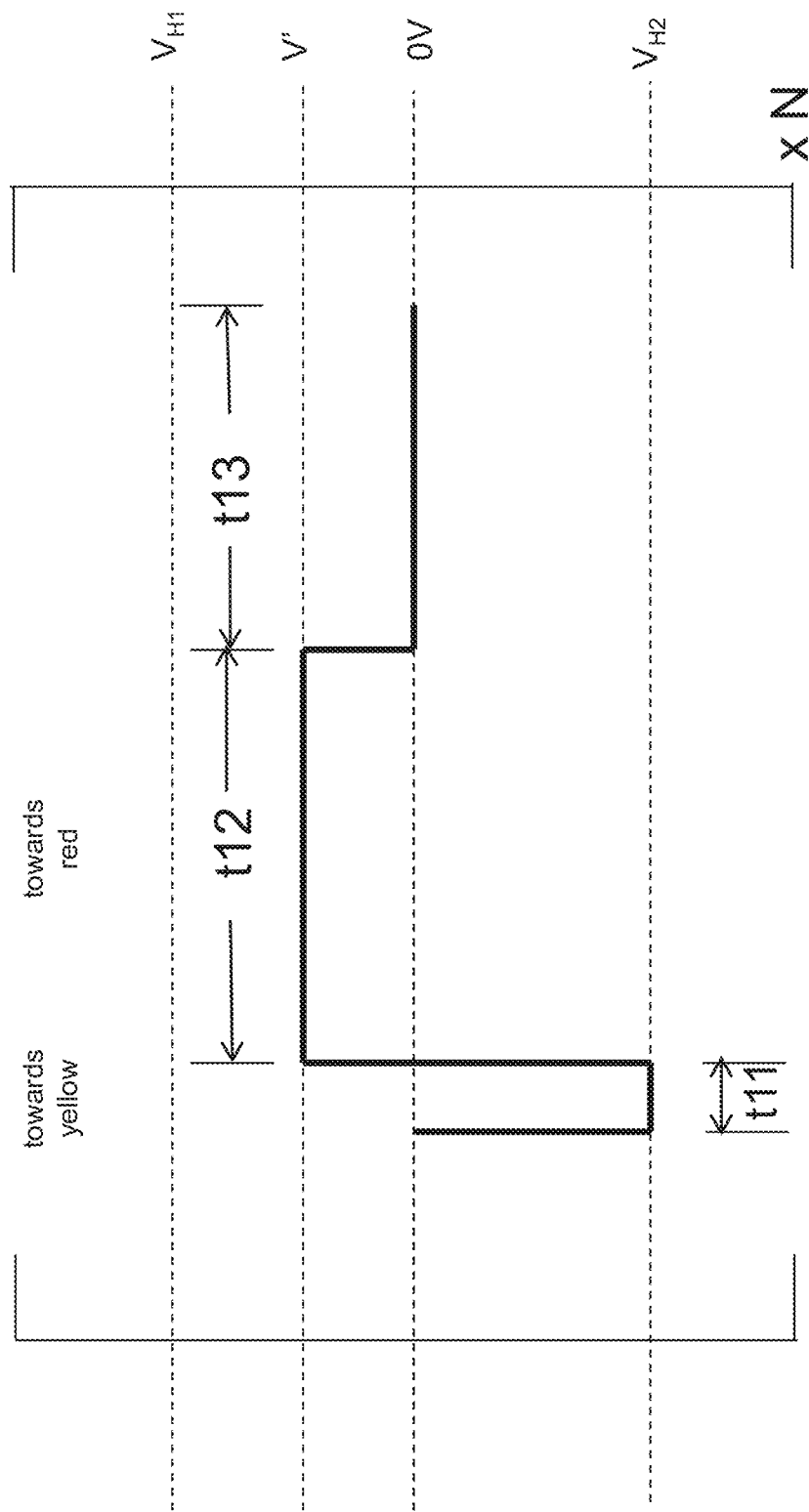
FIGS. 12 and 15 illustrate the third driving method of the present invention.

The Third Driving Method:
Part A:

The second driving method of the present invention is illustrated in FIG. 12. It relates to an alternative to the driving waveform of FIG. 6, which may also be used to replace the driving period of t3 in FIG. 4.

In this alternative waveform, there is a wait time t13 added. During the wait time, no driving voltage is applied. The entire waveform of FIG. 12 is also repeated at least 2 times (N≥2), preferably at least 4 times and more preferably at least 8 times.

The waveform of FIG. 12 is designed to release the charge imbalance stored in the dielectric layers and/or at the interfaces between layers of different materials, in an electrophoretic display device, especially when the resistance of the dielectric layers is high, for example, at a low temperature.

In the context of the present application, the term "low temperature" refers to a temperature below about 10° C.

The wait time presumably can dissipate the unwanted charge stored in the dielectric layers and cause the short pulse (t11) for driving a pixel towards the yellow state and the longer pulse (t12) for driving the pixel towards the red state to be more efficient. As a result, this alternative driving method will bring a better separation of the low charged pigment particles from the higher charged ones.

The time periods, t11 and t12, are similar to t7 and t8 in FIG. 6, respectively. In other words, t12 is greater than t11. The wait time (t13) can be in a range of 5-5,000 msec, depending on the resistance of the dielectric layers.

Figure 13:
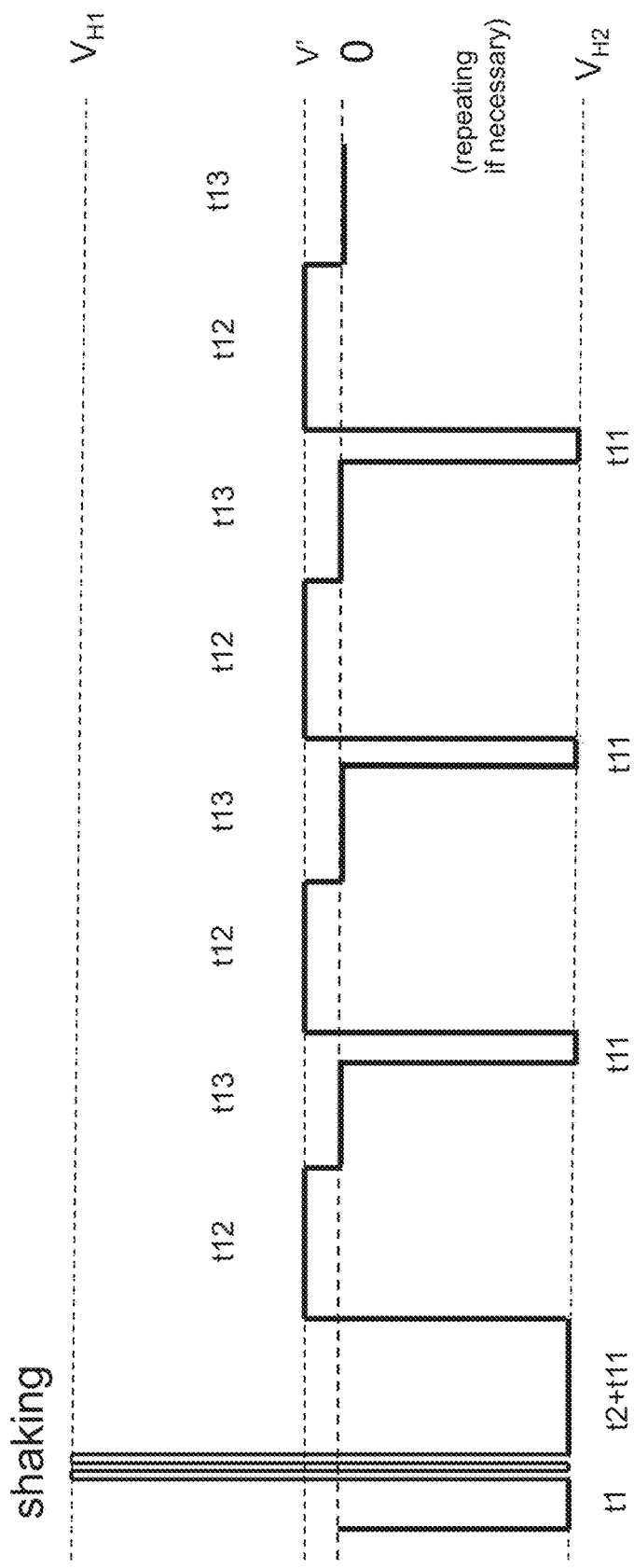
FIGS. 13, 14, 16 and 17 show driving sequences utilizing the third driving method of the present invention.

As stated, the driving waveform as shown in FIG. 12 may also be used to replace the driving period of t3 in FIG. 4 (see FIG. 13). In other words, the driving sequence may be: shaking waveform, followed by driving towards the yellow state for a period of t2 and then applying the waveform of FIG. 12.

Figure 14:
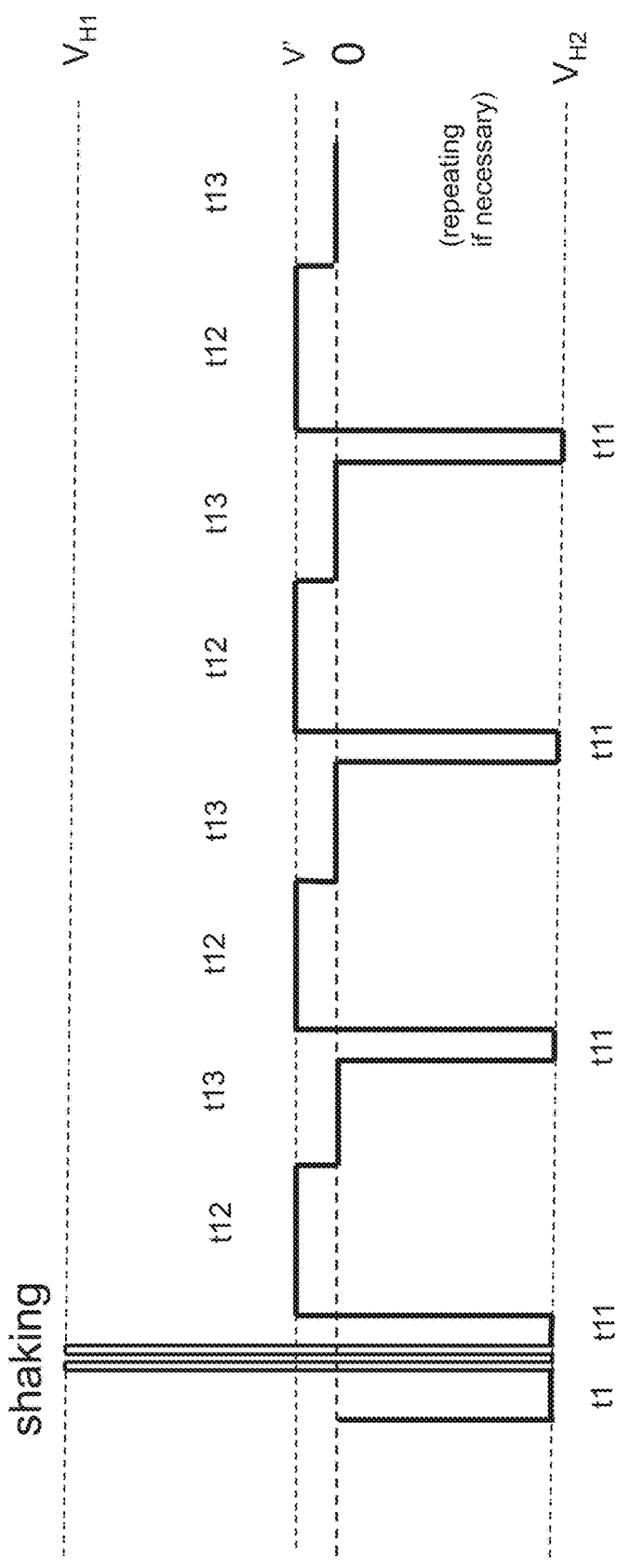

In another embodiment, the step of driving to the yellow state for a period of t2 may be eliminated and in this case, a shaking waveform is applied before applying the waveform of FIG. 12 (see FIG. 14).

In one embodiment, the entire waveform of FIG. 13 is DC balanced. In another embodiment, the entire waveform of FIG. 14 is DC balanced.

Figure 15:
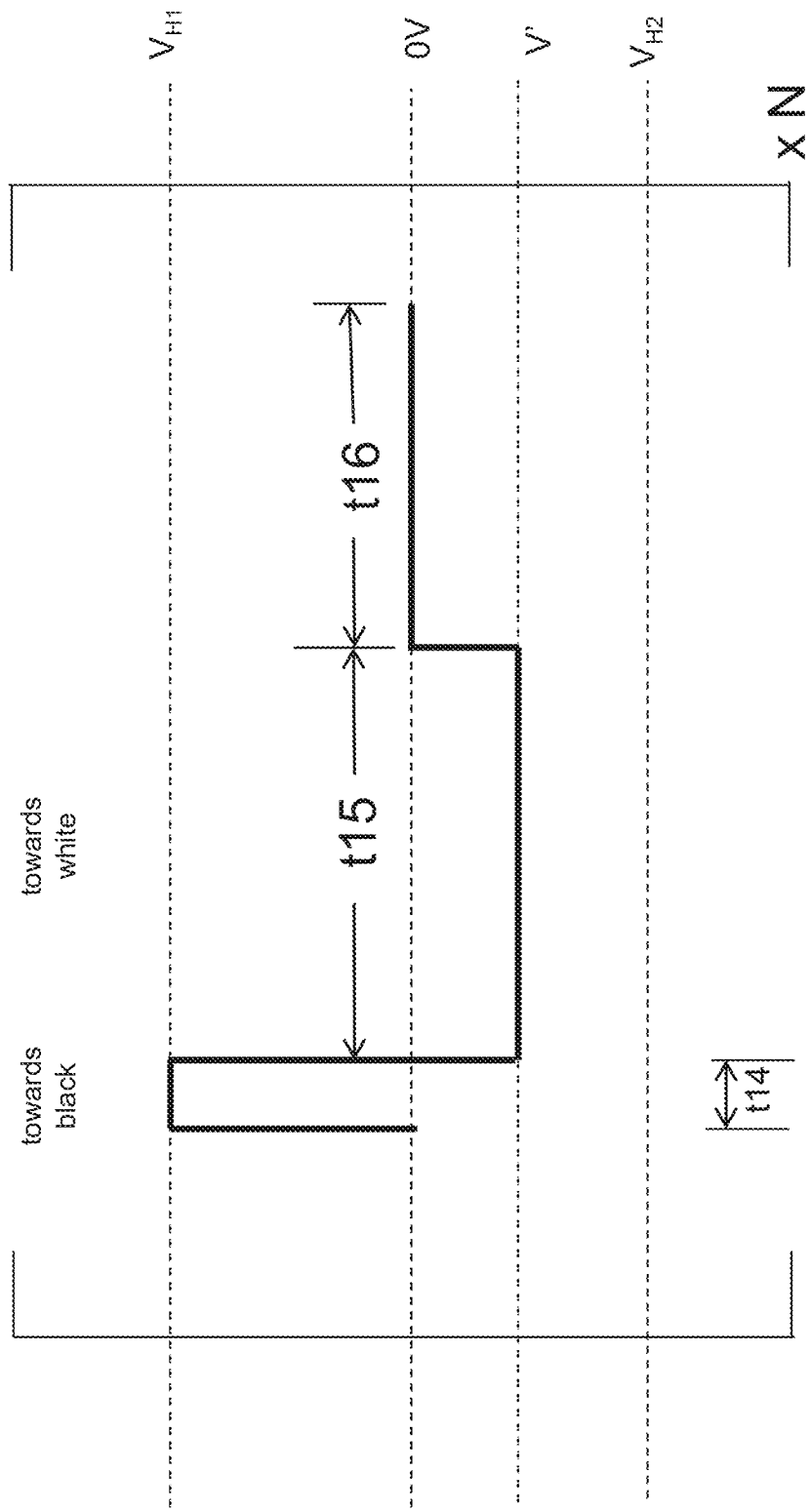

Part B:

FIG. 15 illustrates an alternative to the driving waveform of FIG. 9, which may also be used to replace the driving period of t6 in FIG. 5.

In this alternative waveform, there is a wait time t16 added. During the wait time, no driving voltage is applied. The entire waveform of FIG. 15 is also repeated at least 2 times (N≥2), preferably at least 4 times and more preferably at least 8 times.

Like the waveform of FIG. 12, the waveform of FIG. 15 is also designed to release the charge imbalance stored in the dielectric layers and/or at the interfaces of layers of different materials, in an electrophoretic display device. As stated above, the wait time presumably can dissipate the unwanted charge stored in the dielectric layers and cause the short pulse (t14) for driving a pixel towards the black state and the longer pulse (t15) for driving the pixel towards the white state to be more efficient.

The time periods, t14 and t15, are similar to t9 and t10 in FIG. 9, respectively. In other words, t15 is greater than t14. The wait time (t16) may also be in a range of 5-5,000 msec, depending on the resistance of the dielectric layers.

Figure 16:
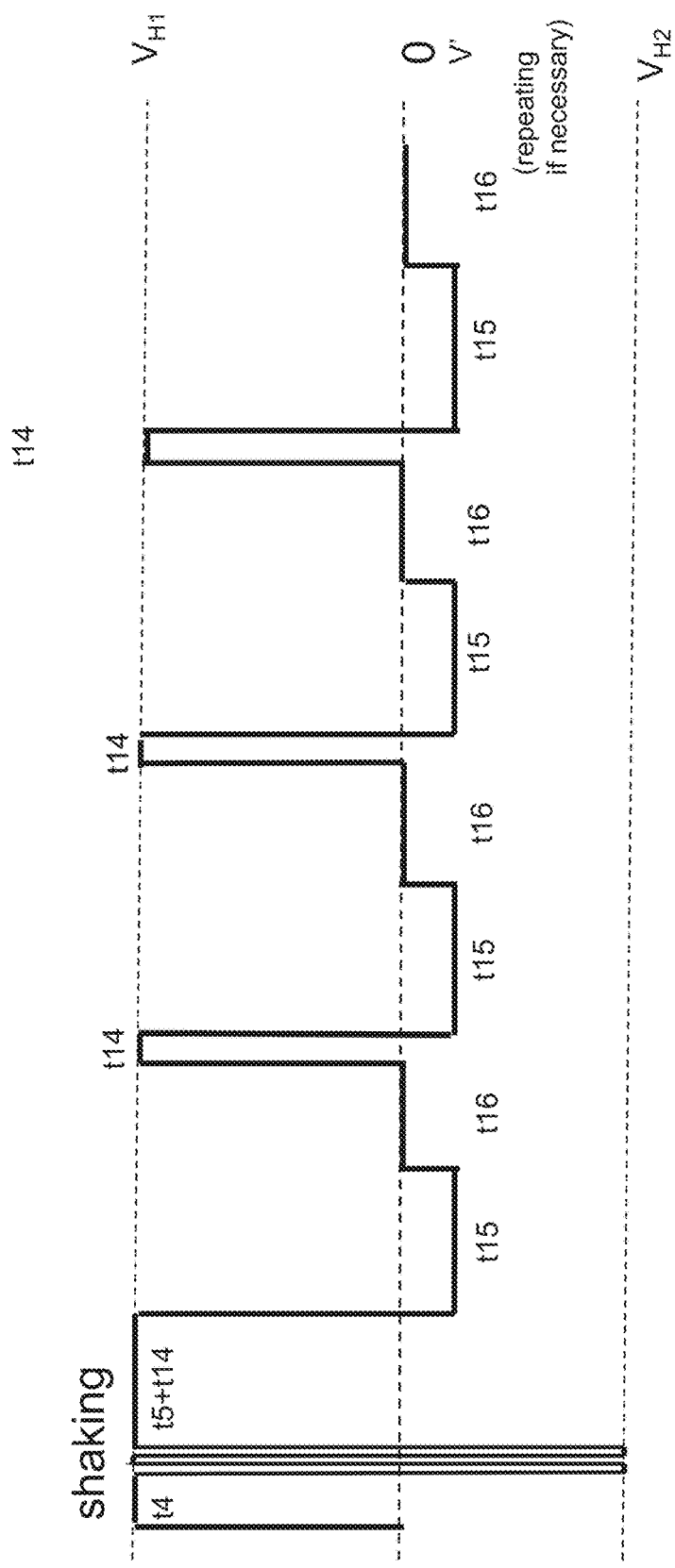

As stated, the driving waveform as shown in FIG. 15 may also be used to replace the driving period of t6 in FIG. 5 (see FIG. 16). In other words, the driving sequence may be: shaking waveform, followed by driving towards the black state for a period of t5 and then applying the waveform of FIG. 15.

Figure 17:
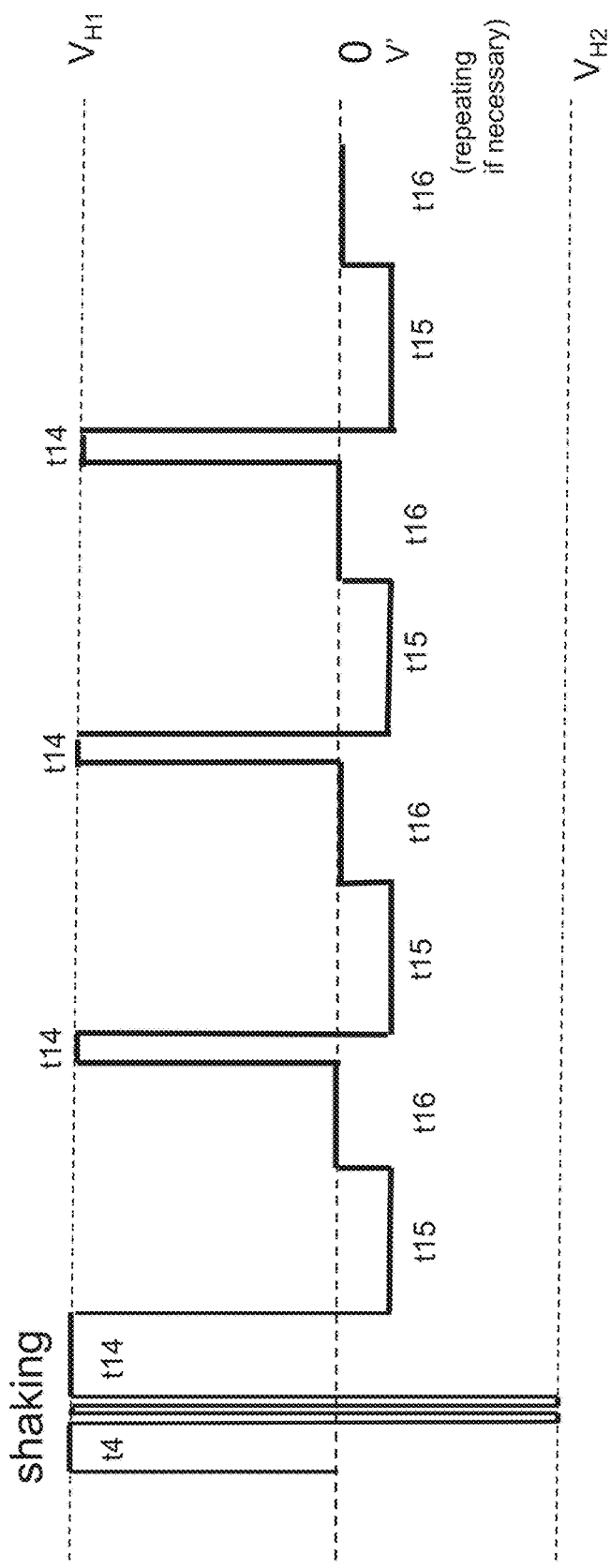

In another embodiment, the step of driving to the black state for a period of t5 may be eliminated and in this case, a shaking waveform is applied before applying the waveform of FIG. 15 (see FIG. 17).

In one embodiment, the entire waveform of FIG. 16 is DC balanced. In another embodiment, the entire waveform of FIG. 17 is DC balanced.

The third driving method of the present invention therefore may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;
(b) the first type of particles carry high positive charge and the second type of particles carry high negative charge; and
(c) the third type of particles carry low positive charge and the fourth type of particles carry low negative charge, the method comprises the following steps:

(i) applying a first driving voltage to a pixel in the electrophoretic display for a first period of time to drive the pixel towards the color state of the first type or second type of particles at the viewing side;
(ii) applying a second driving voltage to the pixel for a second period of time, wherein the second period of time is greater than the first period of time, the second driving voltage has polarity opposite that of the first driving voltage and the second driving voltage has an amplitude lower than that of the first driving voltage, to drive the pixel from the color state of the first type of particles towards the color state of the fourth type of particles or from the color state of the second type of particle towards the color state of the third type of particles, at the viewing side;
(iii) applying no driving voltage to the pixel for a third period of time; and repeating steps (i)-(iii).

In one embodiment, the amplitude of the second driving voltage is less than 50% of the amplitude of the first driving voltage. In one embodiment, steps (i), (ii) and (iii) are repeated at least 2 times, preferably at least 4 times and more preferably at least 8 times. In one embodiment, the method further comprises a shaking waveform before step (i). In one embodiment, the method further comprises a driving step to the full color state of the first or second type of particles after the shaking waveform but prior to step (i).

It should be noted that the lengths of any of the driving periods referred to in this application may be temperature dependent.

Figure 18:
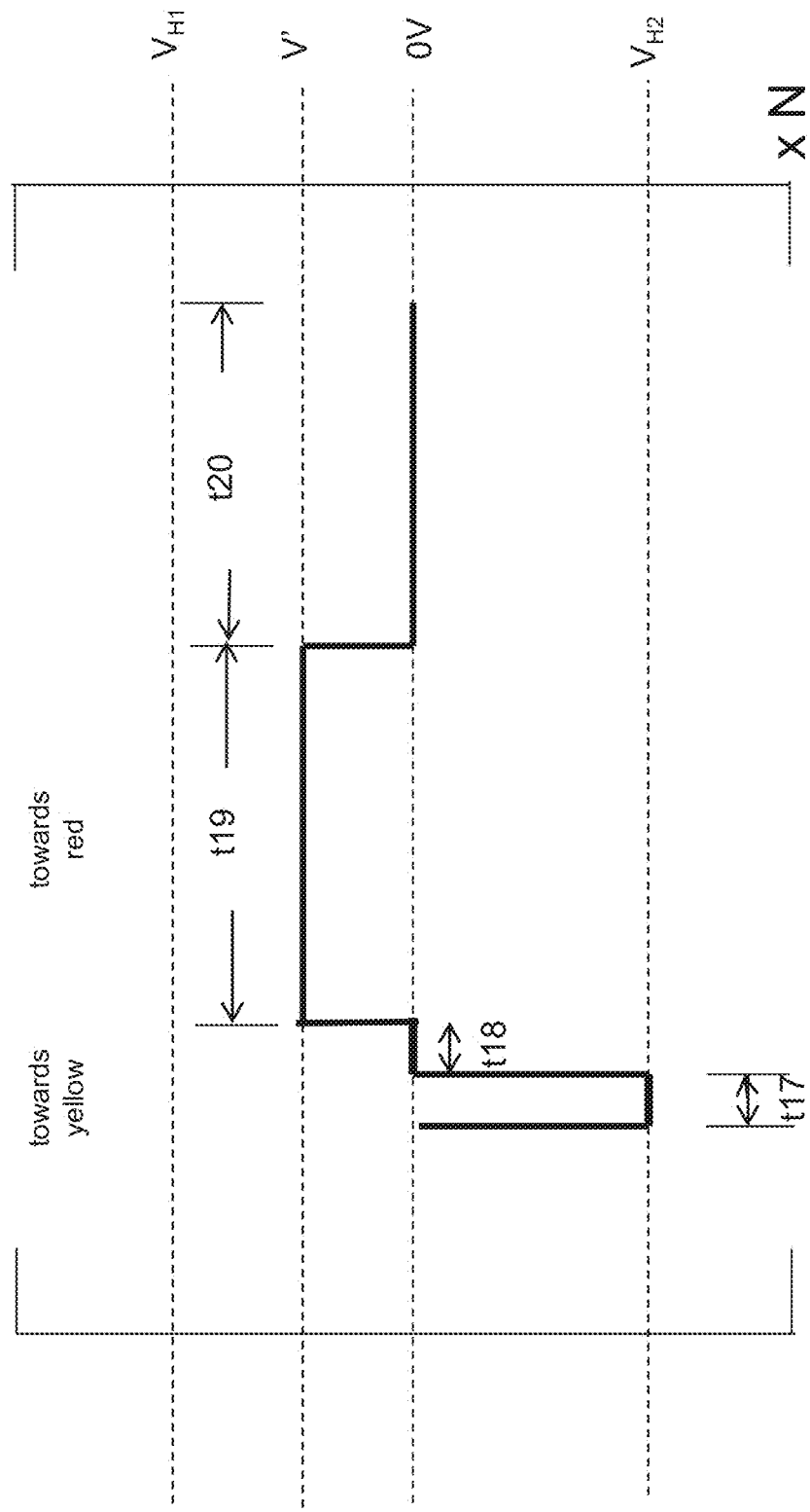
FIGS. 18 and 21 illustrate the fourth driving method of the present invention.

The Fourth Driving Method:
Part A:

The fourth driving method of the present invention is illustrated in FIG. 18. It relates to a driving waveform which may also be used to replace the driving period of t3 in FIG. 4.

In an initial step, a high negative driving voltage ($V_{H2}$, e.g., −15V) is applied to a pixel for a period of t17, which is followed by a wait time of t18. After the wait time, a positive driving voltage (+V', e.g., less than 50% of $V_{H1}$ or $V_{H2}$) is applied to the pixel for a period of t19, which is followed by a second wait time of t20. The waveform of FIG. 18 is repeated at least 2 times, preferably at least 4 times and more preferably at least 8 times. The term, "wait time", as described above, refers to a period of time in which no driving voltage is applied.

In the waveform of FIG. 18, the first wait time t18 is very short while the second wait time t20 is longer. The period of t17 is also shorter than the period of t19. For example, t17 may be in the range of 20-200 msec; t18 may be less than 100 msec; t19 may be in the range of 100-200 msec; and t20 may be less than 1000 msec.

Figure 19:
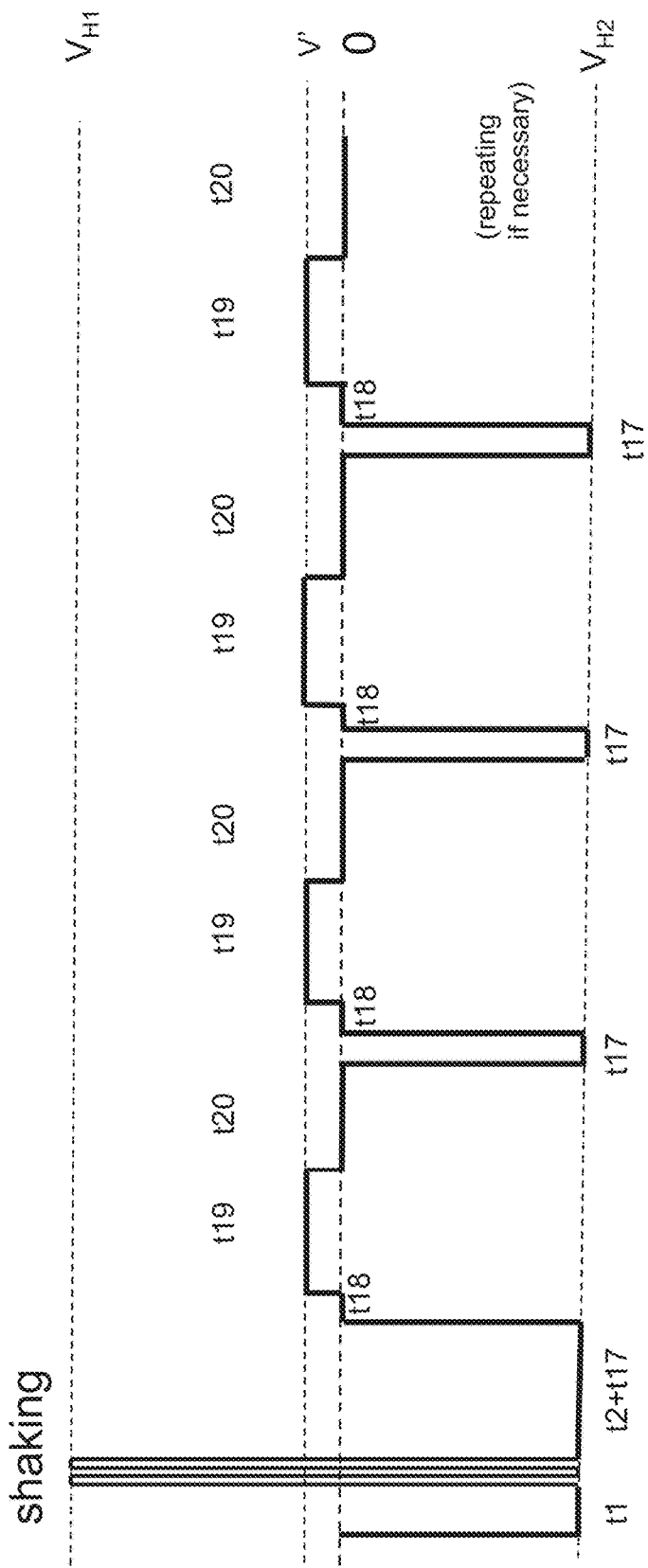
FIGS. 19, 20, 22 and 23 show driving sequences utilizing the fourth driving method of the present invention.

FIG. 19 is a combination of FIG. 4 and FIG. 18. In FIG. 4, a yellow state is displayed during the period of t2. As a general rule, the better the yellow state in this period, the better the red state that will be displayed at the end.

Figure 20:
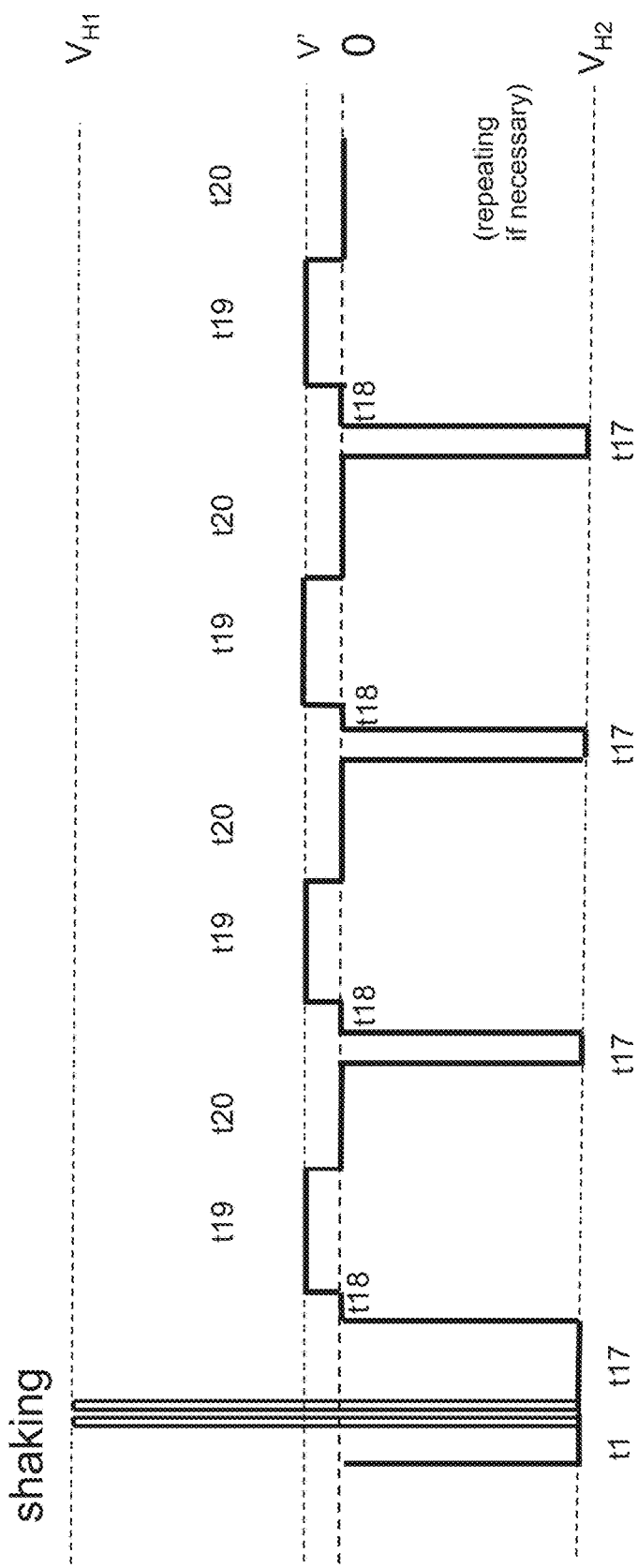

In one embodiment, the step of driving to the yellow state for a period of t2 may be eliminated and in this case, a shaking waveform is applied before applying the waveform of FIG. 18 (see FIG. 20).

In one embodiment, the entire waveform of FIG. 19 is DC balanced. In another embodiment, the entire waveform of FIG. 20 is DC balanced.

Figure 21:
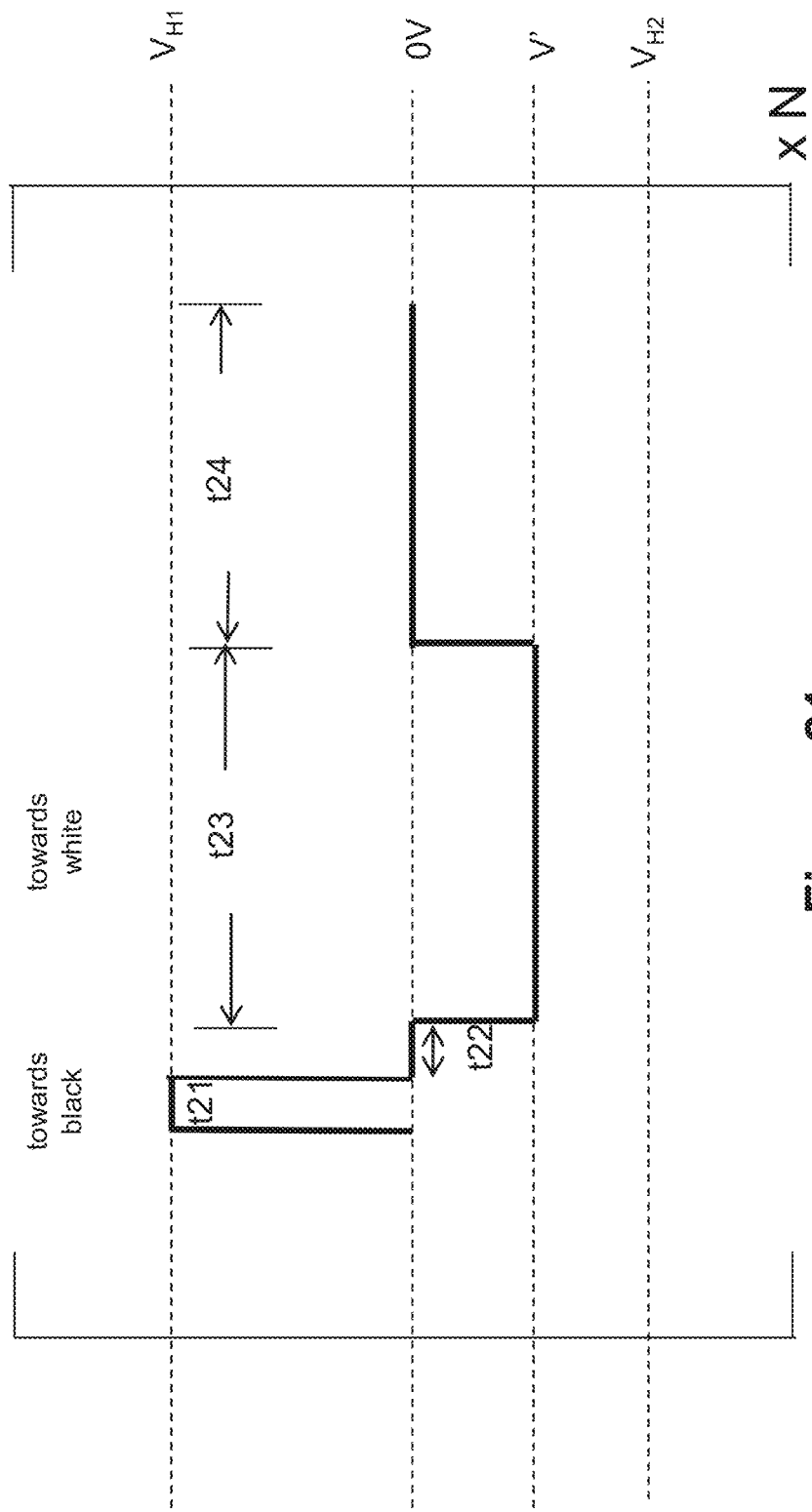

Part B:

FIG. 21 illustrates a driving waveform which may also be used to replace the driving period of t6 in FIG. 5.

In an initial step, a high positive driving voltage (Yin, e.g., +15V) is applied to a pixel for a period of t21, which is followed by a wait time of t22. After the wait time, a negative driving voltage (−V', e.g., less than 50% of $V_{H1}$ or $V_{H2}$) is applied to the pixel for a period of t23, which is followed by a second wait time of t24. The waveform of FIG. 21 may also be repeated at least 2 times, preferably at least 4 times and more preferably at least 8 times.

In the waveform of FIG. 21, the first wait time t22 is very short while the second wait time t24 is longer. The period of t21 is also shorter than the period of t23. For example, t21 may be in the range of 20-200 msec; t22 may be less than 100 msec; t23 may be in the range of 100-200 msec; and t24 may be less than 1000 msec.

Figure 22:
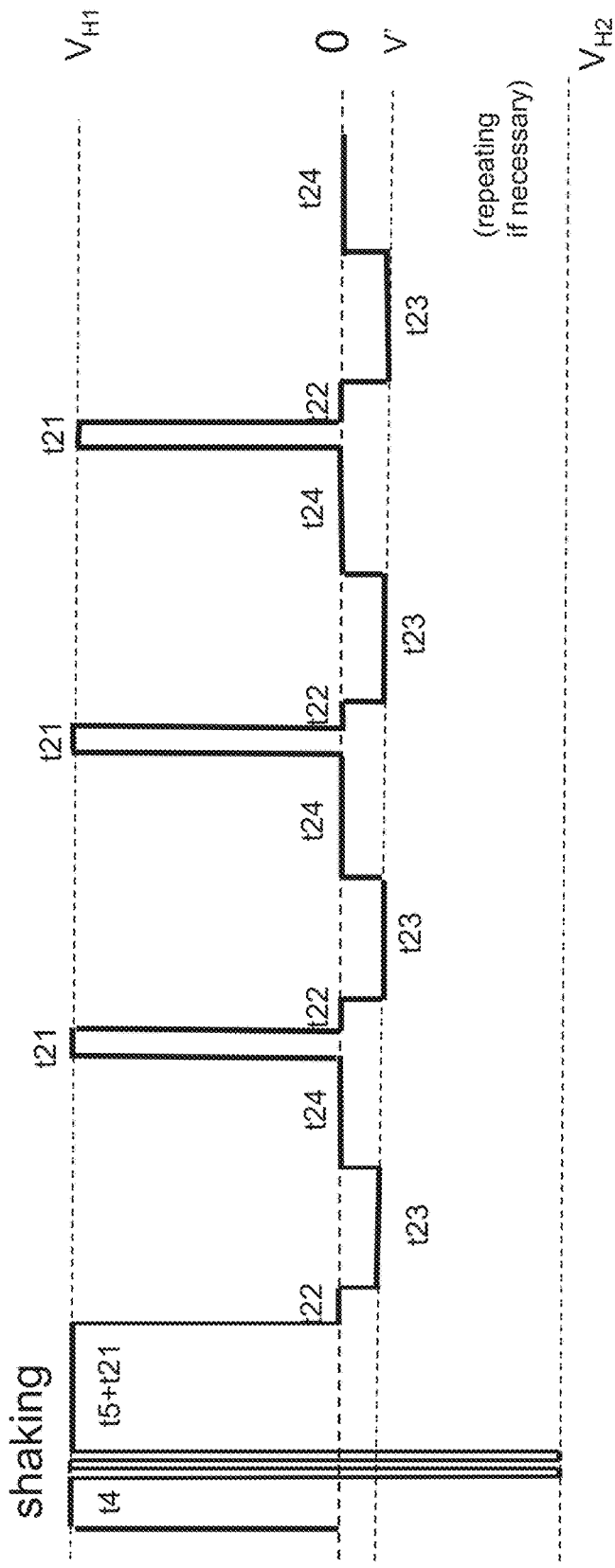

FIG. 22 is a combination of FIG. 5 and FIG. 21. In FIG. 5, a black state is displayed during the period of t5. As a general rule, the better the black state in this period, the better the white state that will be displayed at the end.

Figure 23:
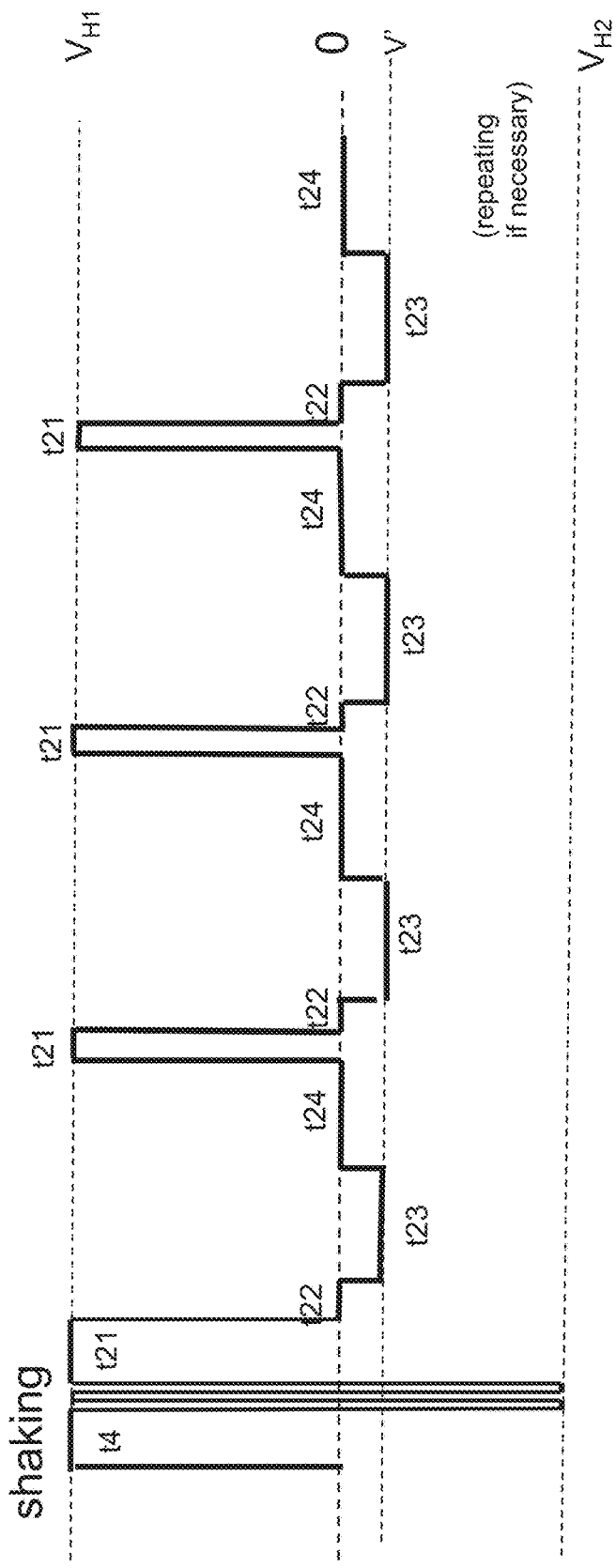

In one embodiment, the step of driving to the black state for a period of t5 may be eliminated and in this case, a shaking waveform is applied before applying the waveform of FIG. 21 (see FIG. 23).

In one embodiment, the entire waveform of FIG. 22 is DC balanced. In another embodiment, the entire waveform of FIG. 23 is DC balanced.

The fourth driving method of the invention may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;
(b) the first type of particles carry high positive charge and the second type of particles carry high negative charge; and
(c) the third type of particles carry low positive charge and the fourth type of particles carry low negative charge, the method comprises the following steps:

(i) applying a first driving voltage to a pixel in the electrophoretic display for a first period of time to drive the pixel towards the color state of the first or second type of particles at the viewing side;
(ii) applying no driving voltage to the pixel for a second period of time;
(iii) applying a second driving voltage to the pixel for a third period of time, wherein the third period of time is greater than the first period of time, the second driving voltage has polarity opposite that of the first driving voltage and the second driving voltage has an amplitude lower than that of the first driving voltage, to drive the pixel from the color state of the first type of particles towards the color state of the fourth type of particles or from the color state of the second type of particles towards the color state of the third type of particles, at the viewing side;

(iv) applying no driving voltage to the pixel for a fourth period of time; and repeating steps (i)-(iv).

In one embodiment, the amplitude of the second driving voltage is less than 50% of the amplitude of the first driving voltage. In one embodiment, steps (i)-(iv) are repeated at least 2 times, preferably at least 4 times and more preferably at least 8 times. In one embodiment, the method further comprises a shaking waveform before step (i). In one embodiment, the method further comprises driving the pixel to the color state of the first or second type of particles after the shaking waveform but prior to step (i).

This driving method not only is particularly effective at a low temperature, it can also provide a display device better tolerance of structural variations caused during manufacture of the display device. Therefore its usefulness is not limited to low temperature driving.

The Fifth Driving Method:

Part A:

This driving method is particularly suitable for low temperature driving of a pixel from the yellow state (high negative) to the red state (low positive).

Figure 24:
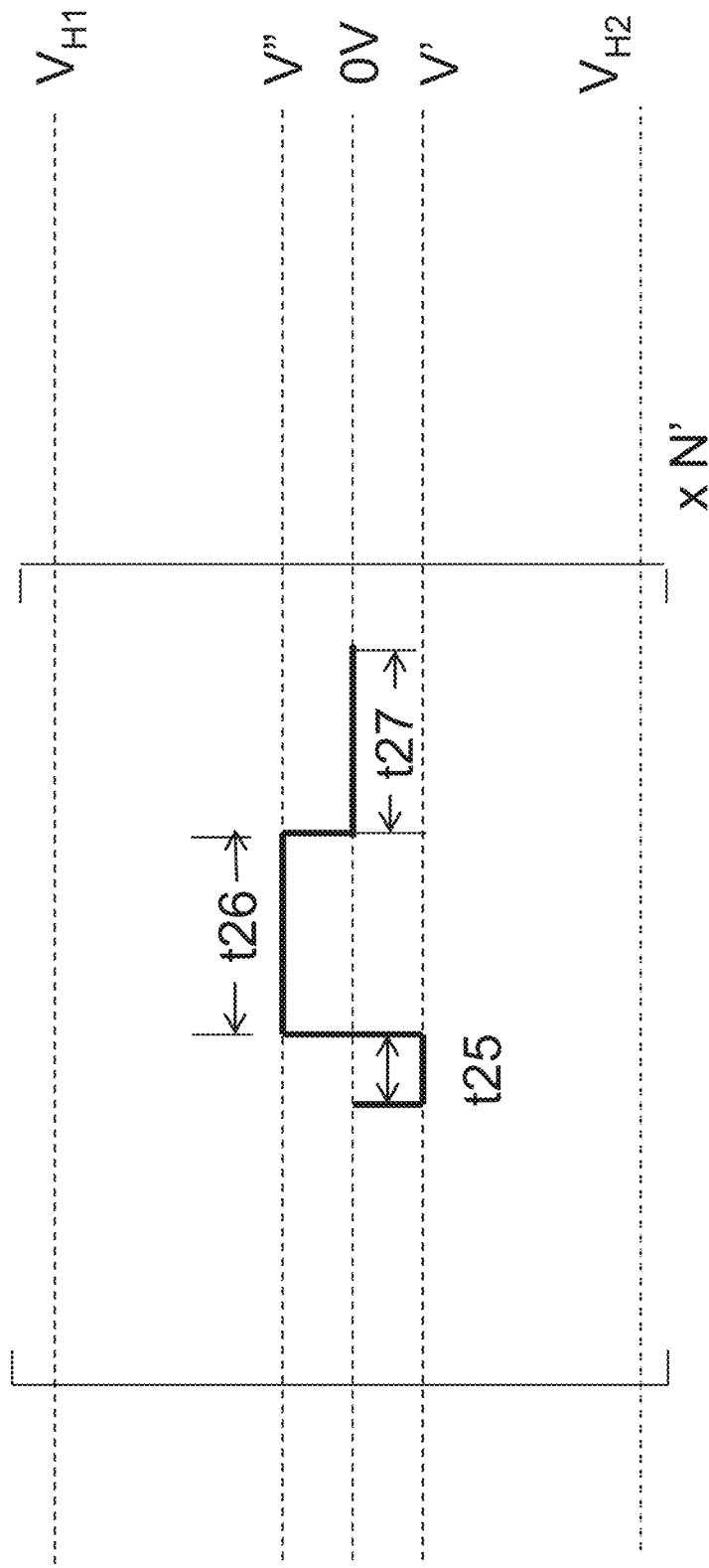
FIGS. 24 and 27 illustrate the fifth driving method of the present invention.

As shown in FIG. 24, a low negative driving voltage (−V') is first applied for a time period of t25, followed by a low positive driving voltage (+V") for a time period of t26. Since the sequence is repeated, there is also a wait time of t27 between the two driving voltages. Such a waveform may be repeated at least 2 times (N'≥2), preferably at least 4 times and more preferably at least 8 times.

The time period of t25 is shorter than the time period of t26. The time period of t27 may be in the range of 0 to 200 msec.

The amplitudes of the driving voltages, V' and V" may be 50% of the amplitude of $V_H$ (e.g., $V_{H1}$ or $V_{H2}$). It is also noted that the amplitude of V' may be the same as, or different from, the amplitude of V".

It has also been found that the driving waveform of FIG. 24 is most effective when applied in conjunction with the waveform of FIGS. 19 and 20. The combinations of the two driving waveforms are shown in FIGS. 25 and 26, respectively.

Figure 25:
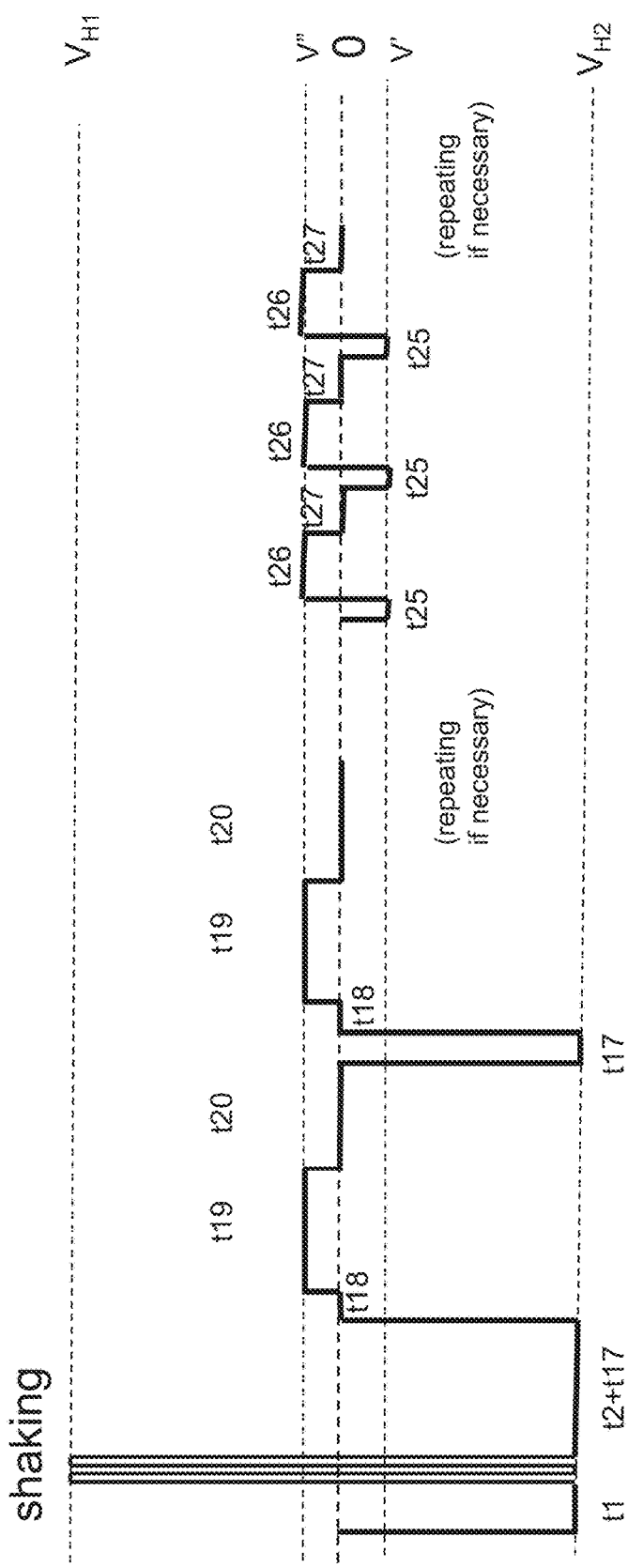
FIGS. 25, 26, 28 and 29 show driving sequences utilizing the fifth driving method of the present invention.
Figure 26:
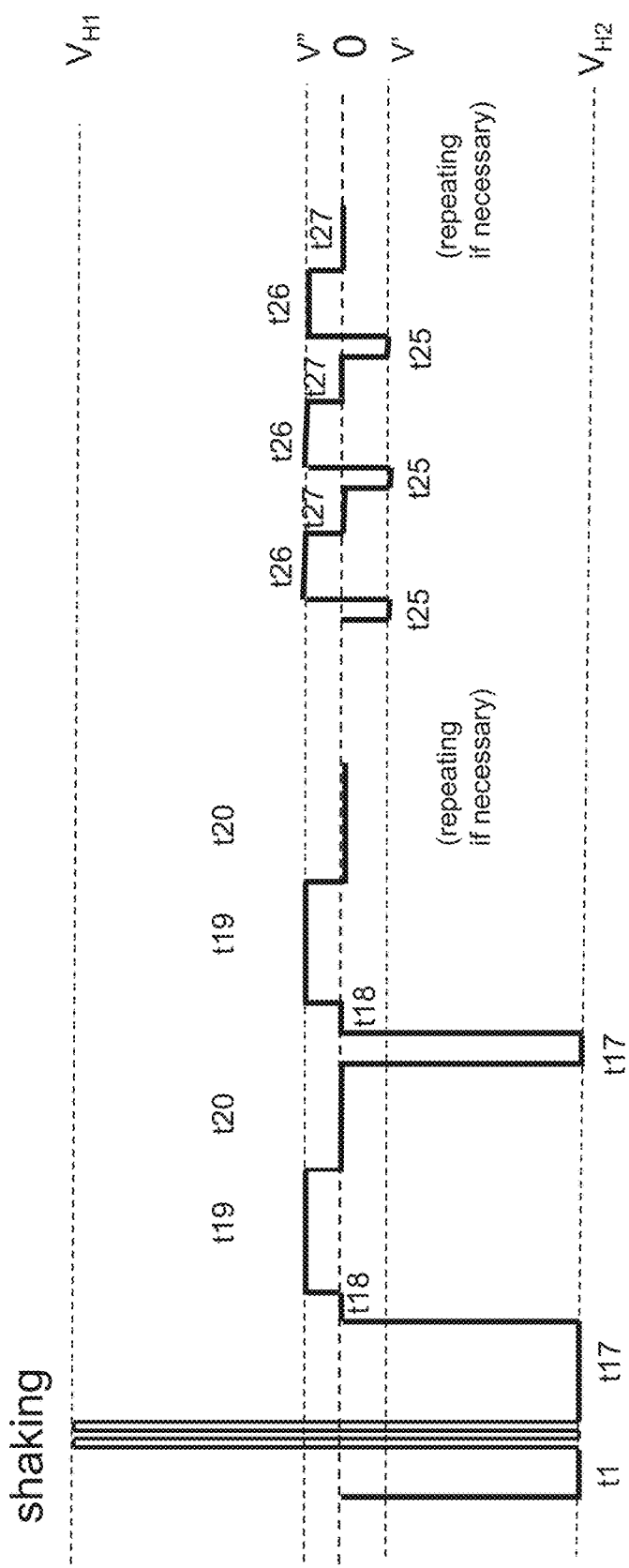

In one embodiment, the entire waveform of FIG. 25 is DC balanced. In another embodiment, the entire waveform of FIG. 26 is DC balanced.

Part B:

This driving method is particularly suitable for low temperature driving of a pixel from the black state (high positive) to the white state (low negative).

Figure 27:
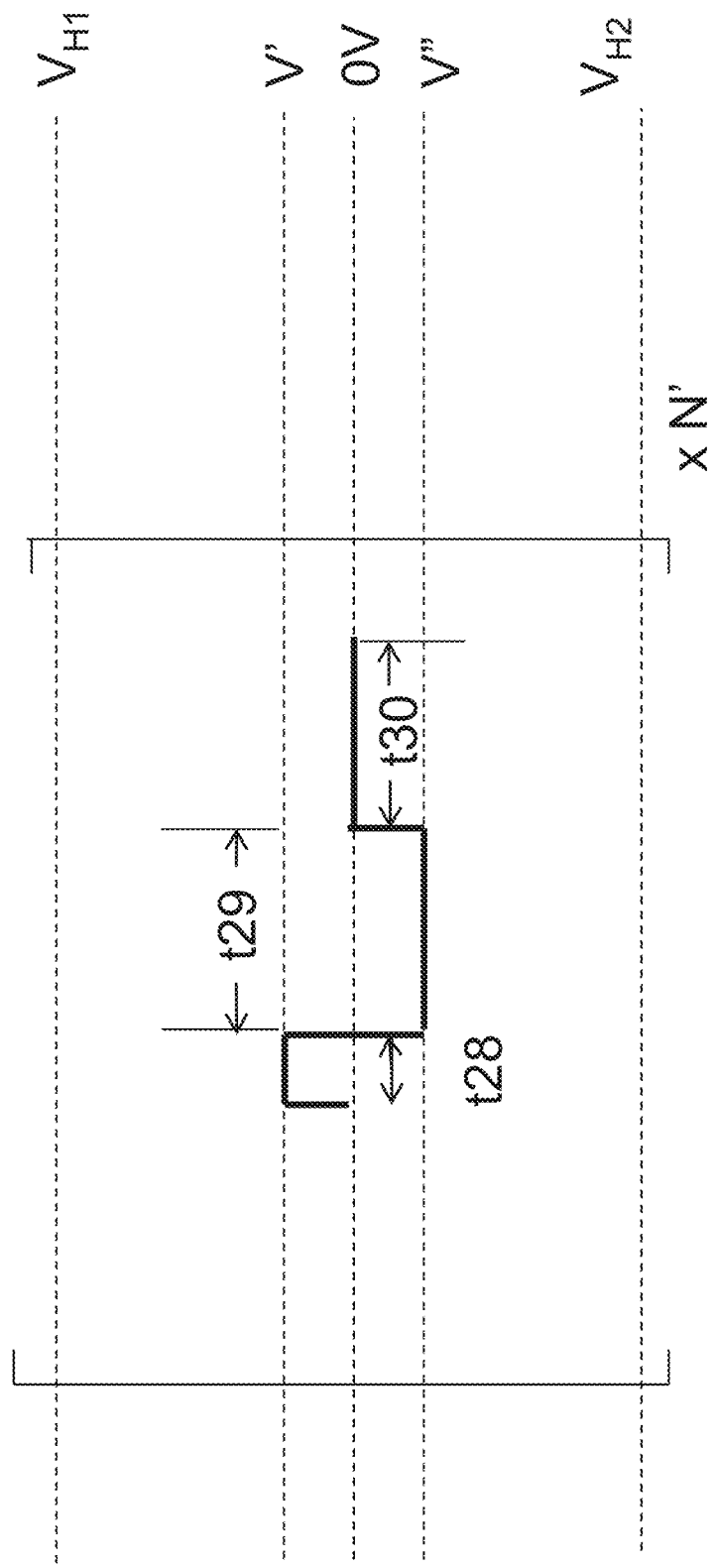

As shown in FIG. 27, a low positive driving voltage (+V') is first applied for a time period of t28, followed by a low negative driving voltage (−V") for a time period of t29. Since this sequence is repeated, there is also a wait time of t30 between the two driving voltages. Such a waveform may be repeated at least 2 times (e.g., N'≥2), preferably at least 4 times and more preferably as least 8 times.

The time period of t28 is shorter than the time period of t29. The time period of t30 may be in the range of 0 to 200 msec.

The amplitudes of the driving voltages, V' and V" may be 50% of the amplitude of $V_H$ (e.g., $V_{H1}$ or $V_{H2}$). It is also noted that the amplitude of V' may be the same as, or different from, the amplitude of V".

It has also been found that the driving waveform of FIG. 27 is most effective when applied in conjunction with the waveform of FIGS. 22 and 23. The combinations of the two driving waveforms are shown in FIGS. 28 and 29, respectively.

Figure 28:
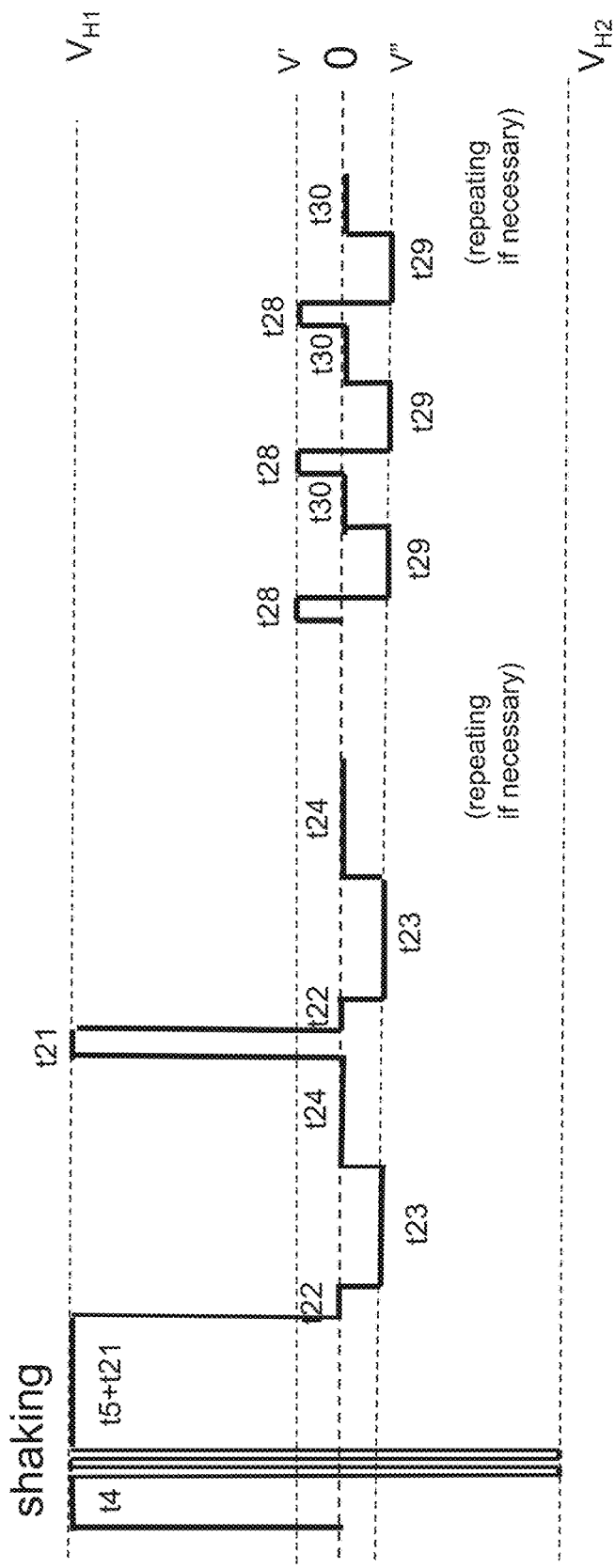
Figure 29:
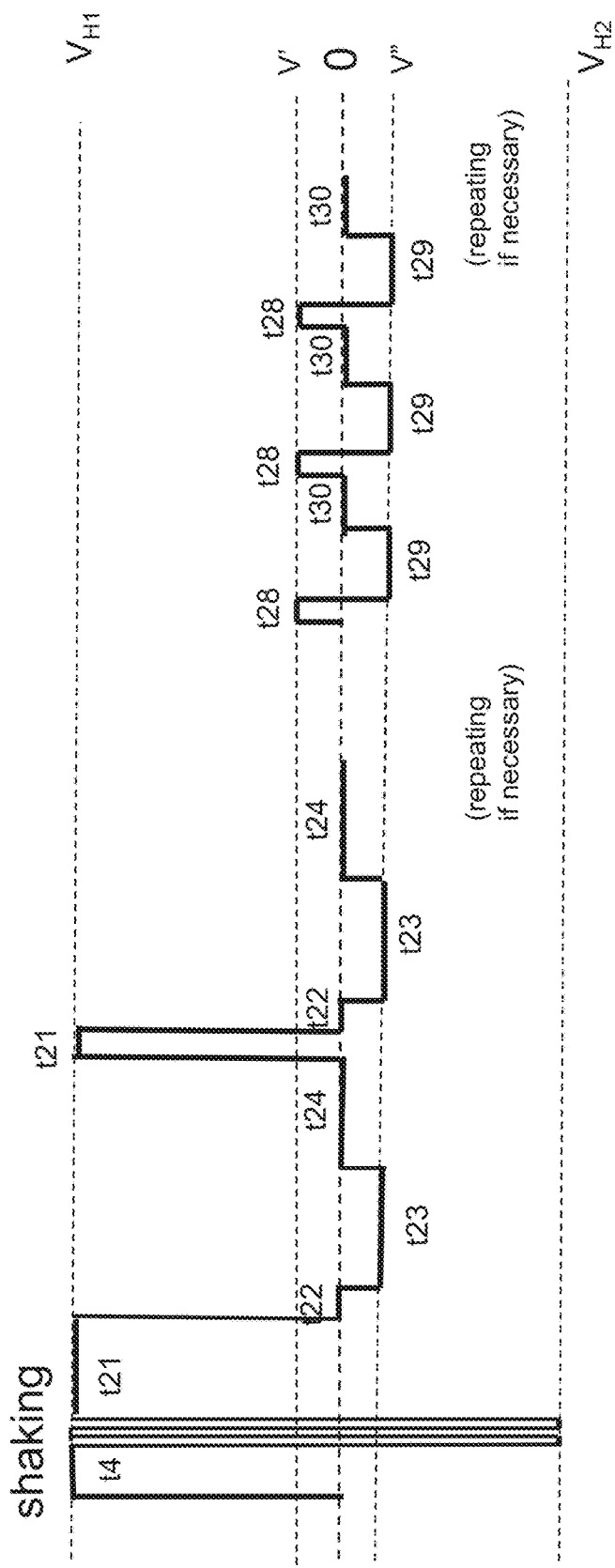

In one embodiment, the entire waveform of FIG. 28 is DC balanced. In another embodiment, the entire waveform of FIG. 29 is DC balanced.

The fifth driving method can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;

(b) the first type of particles carry high positive charge and the second type of particles carry high negative charge; and (c) the third type of particles carry low positive charge and the fourth type of particles carry low negative charge, the method comprises the following steps:

(i) applying a first driving voltage to a pixel in the electrophoretic display for a first period of time to drive the pixel towards the color state of the first or second type of particles at the viewing side;

(ii) applying no driving voltage to the pixel for a second period of time;

(iii) applying a second driving voltage to the pixel for a third period of time, wherein the third period of time is greater than the first period of time, the second driving voltage has polarity opposite that of the first driving voltage and the second driving voltage has an amplitude lower than that of the first driving voltage;

(iv) applying no driving voltage to the pixel for a fourth period of time; and repeating steps (i)-(iv);

(v) applying a third driving voltage to the pixel for a fifth period of time, wherein the third driving voltage has polarity same as that of the first driving voltage;

(vi) applying a fourth driving voltage to the pixel for a sixth period of time, wherein the fifth period of time is shorter than the sixth period of time and the fourth driving voltage has polarity opposite that of the first driving voltage to drive the pixel from the color state of the first type of particles towards the color state of the fourth type of particles or from the color state of the second type of particles towards the color state of the third type of particles, at the viewing side;

(vii) applying no driving voltage for a seventh period of time; and repeating steps (v)-(vii).

In one embodiment, the amplitudes of both the third driving voltage and the fourth driving voltage are less than 50% of the amplitude of the first driving voltage. In one embodiment, steps (v)-(vii) are repeated at least 2 times, preferably at least 4 times and more preferably at least 8 times.

The Sixth Driving Method

Figure 30:
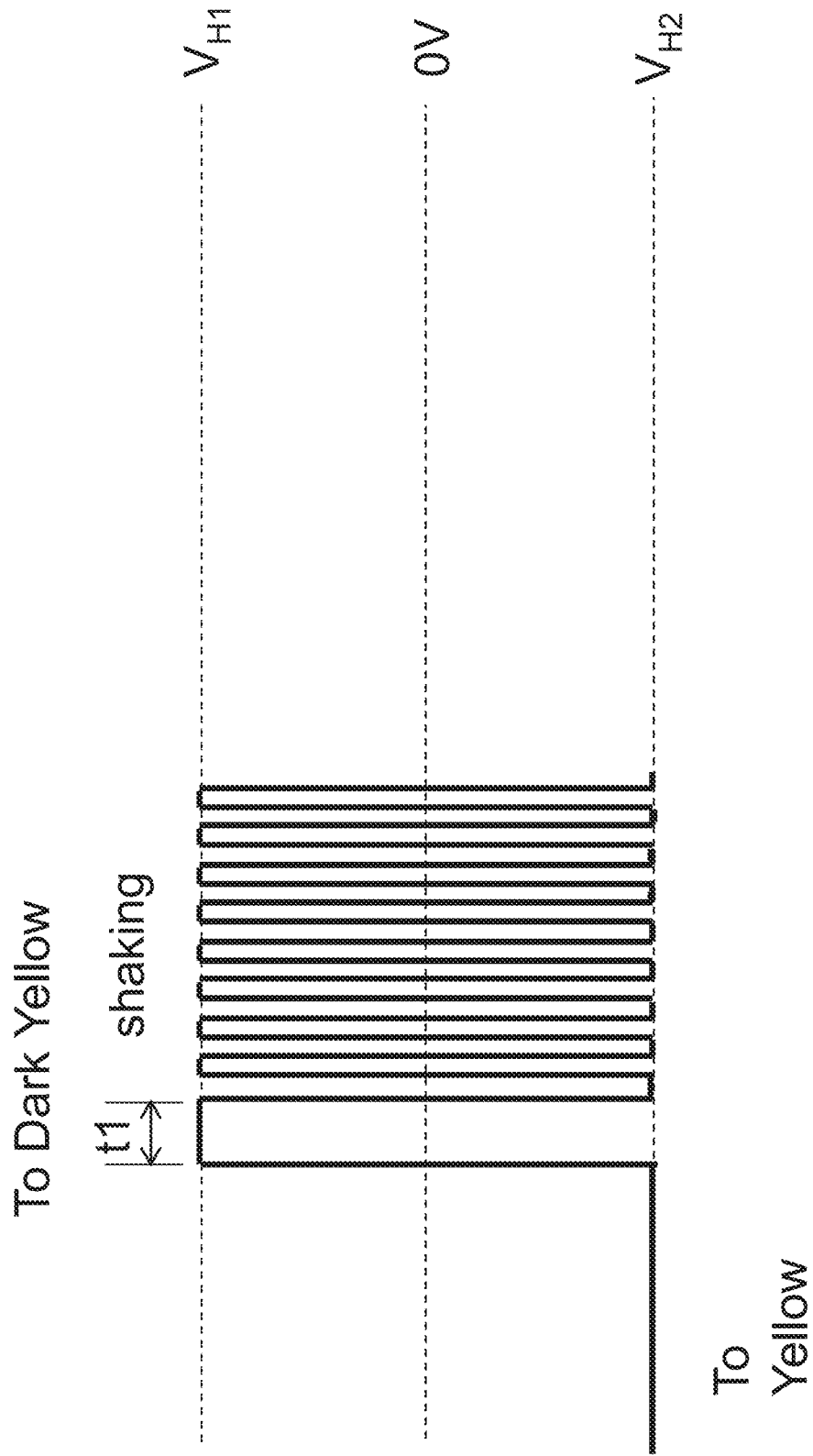
FIG. 30 illustrates a driving method of the present invention.

FIGS. 30 and 31 illustrate alternative driving methods of the invention. The methods may also be viewed as "re-set" or "pre-condition", prior to driving a pixel to a desired color state.

The waveform in FIG. 30 comprises three parts, (i) driving to a first state (yellow), (ii) applying a driving voltage ($V_H$, e.g., +15V) having the same polarity as that of the second (black) particles for a short period of time, $t_1$, which is not sufficiently long to drive from the first (yellow) state to the second (black) state, resulting in a dark yellow state, and (iii) shaking.

The waveform in FIG. 31 is the complimentary waveform to FIG. 30 and comprises three parts, (i) driving to second state (black), (ii) applying a driving voltage ($V_{H2}$, e.g., −15V) having the same polarity as that of the second (yellow) particles for a short period of time, $t_2$, which is not sufficiently long to drive from the second (black) state to the first (yellow) state, resulting in a dark yellow state, and (iii) shaking.

The length of $t_1$ or $t_2$ would depend on not only the final color state driven to (after the re-set and pre-condition waveform of FIG. 30 or 31), but also the desired optical performance of the final color state (e.g., a*, ΔL* and Δa*). For example, there is least ghosting when $t_1$ in the waveform of FIG. 30 is 40 msec and pixels are driven to the third (white) state regardless of whether they are driven from red, black, yellow, or white. Similarly, there is least ghosting when $t_1$ is 60 msec and pixels are driven to the second (black) state regardless of whether they are driven from red, black, yellow, or white.

The shaking waveform consists of repeating a pair of opposite driving pulses for many cycles. For example, the shaking waveform may consist of a +15V pulse for 20 msec and a −15V pulse for 20 msec and such a pair of pulses is repeated for 50 times. The total time of such a shaking waveform would be 2000 msec.

Each of the driving pulses in the shaking waveform is applied for not exceeding half of the driving time required for driving from the full black state to the full white state, or vice versa. For example, if it takes 300 msec to drive a pixel from a full black state to a full yellow state, or vice versa, the shaking waveform may consist of positive and negative pulses, each applied for not more than 150 msec. In practice, it is preferred that the pulses are shorter.

It is noted that in FIGS. 30 and 31, the shaking waveform is abbreviated (i.e., the number of pulses is fewer than the actual number).

After shaking is completed, the four types of particles should be in a mixed state in the display fluid.

After this "re-set" or "pre-condition" of FIG. 30 or 31 is completed, a pixel is then driven to a desired color state (e.g., black, red, yellow, or white). For example, a positive pulse may be applied to drive the pixel to black; a negative pulse may be applied to drive the pixel to yellow; a negative pulse followed by a positive pulse of lower amplitude may be applied to drive the pixel to white, or a positive pulse followed by a negative pulse of lower amplitude may be applied to drive the pixel to red.

When comparing driving methods with or without the "re-set" or "pre-condition" of the present invention, the methods with the "re-set" or "pre-condition" of the present invention have the added advantage of shorter waveform time in achieving the same levels of optical performance (including ghosting).

The driving methods of the present invention can be summarized as follows:

A driving method for driving a pixel of an electrophoretic display comprising a first surface on a viewing side, a second surface on a non-viewing side, and an electrophoretic fluid disposed between a first light-transmissive electrode and a second electrode, the electrophoretic fluid comprising a first type of particles, a second type of particles, a third type of particles, and a fourth type of particles, all of which are dispersed in a solvent, wherein (a) the four types of pigment particles have different optical characteristics;
(b) the first type of particles and the third type of particles are positively charged, wherein the first type of particles have a greater magnitude of positive charge than the third particles; and
(c) the second type of particles and the fourth type of particles are negatively charged, wherein the second type of particles have a greater magnitude of negative charge than the fourth particles, the method comprises the steps of:
(i) applying a first driving voltage to the pixel of the electrophoretic display for a first period of time at a first amplitude to drive the pixel to a color state of the first or the second type of particles at the viewing side;
(ii) applying a second driving voltage to the pixel of the electrophoretic display for a second period of time, wherein the second driving voltage has a polarity opposite to that of the first driving voltage and a second amplitude smaller than that of the first amplitude, wherein the second period is not sufficiently long to drive the pixel to a color state of the second type of particles at the viewing side, or when the first driving voltage drives the pixel to a color state of the second type of particles, the second period is not sufficiently long to drive the pixel to a color state of the first type of particles at the viewing side; and applying a shaking waveform.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

The invention claimed is:

1. A driving method for an electrophoretic display comprising a first surface on a viewing side, a second surface on a non-viewing side and an electrophoretic fluid which fluid is sandwiched between a common electrode and a layer of pixel electrodes and comprises a first type of particles, a second type of particles, a third type of particles and a fourth type of particles, all of which are dispersed in a solvent or solvent mixture, wherein (a) the four types of pigment particles have optical characteristics differing from one another;
(b) the first type of particles carry high positive charge and the second type of particles carry high negative charge; and
(c) the third type of particles carry low positive charge and the fourth type of particles carry low negative charge, the method comprises the following steps:
(i) applying a first driving voltage to a pixel in the electrophoretic display for a first period of time to drive the pixel towards the color state of the first or second type of particles at the viewing side;
(ii) applying no driving voltage to the pixel for a second period of time;
(iii) applying a second driving voltage to the pixel for a third period of time, wherein the third period of time is greater than the first period of time, the second driving voltage has polarity opposite that of the first driving voltage and the second driving voltage has an amplitude lower than that of the first driving voltage;

(iv) applying no driving voltage to the pixel for a fourth period of time; and repeating steps (i)-(iv);

(v) applying a third driving voltage to the pixel for a fifth period of time, wherein the third driving voltage has polarity same as that of the first driving voltage;

(vi) applying a fourth driving voltage to the pixel for a sixth period of time, wherein the fifth period of time is shorter than the sixth period of time and the fourth driving voltage has polarity opposite that of the first driving voltage to drive the pixel from the color state of the first type of particles towards the color state of the fourth type of particles or from the color state of the second type of particles towards the color state of the third type of particles, at the viewing side;

(vii) applying no driving voltage for a seventh period of time; and repeating steps (v)-(vii).

2. The driving method of claim 1, wherein the second period of time in step (ii) is longer than the first period of time in step (i).

3. The driving method of claim 1, further comprising repeating steps (v)-(vii) at least 2 times.

4. The driving method of claim 3, wherein steps (v)-(vii) are repeated at least 4 times.

5. The driving method of claim 4, wherein steps (v)-(vii) are repeated at least 8 times.

6. The driving method of claim 1, wherein the amplitude of both the third driving voltage and the fourth driving voltage is less than 50% of the amplitude of the first driving voltage.

7. The driving method of claim 1, wherein the magnitude of the positive charge of the third particle is less than 50% of the magnitude of the positive charge of the first particle.

8. The driving method of claim 1, wherein the magnitude of the negative charge of the fourth particle is less than 75% of the magnitude of the negative charge of the second particle.

9. The driving method of claim 1, further comprising applying a voltage with a shaking waveform to the electrophoretic display before step (i).

10. The driving method of claim 1, wherein steps (i)-(vii) represent a waveform, and the waveform is DC balanced.

* * * * *